(12) United States Patent
Hoshihira et al.

(10) Patent No.: US 8,970,058 B2
(45) Date of Patent: Mar. 3, 2015

(54) WIND POWER GENERATION SYSTEM, WIND POWER GENERATION CONTROL DEVICE AND WIND POWER GENERATION CONTROL METHOD

(71) Applicant: Hitachi Power Solutions Co., Ltd., Hitachi-shi, Ibaraki (JP)

(72) Inventors: Yugo Hoshihira, Hitachi (JP); Naoki Hoshino, Hitachi (JP); Masaya Takahashi, Hitachinaka (JP); Shinichi Kondou, Hitachi (JP); Nobuhiro Kusuno, Hitachi (JP)

(73) Assignee: Hitachi Power Solutions Co., Ltd., Hitachi-shi (JP)

( * ) Notice: Subject to any disclaimer, the term of this patent is extended or adjusted under 35 U.S.C. 154(b) by 19 days.

(21) Appl. No.: 13/962,753

(22) Filed: Aug. 8, 2013

(65) Prior Publication Data
US 2014/0042747 A1  Feb. 13, 2014

(30) Foreign Application Priority Data
Aug. 10, 2012 (JP) ................. 2012-177788

(51) Int. Cl.
*B60L 11/12* (2006.01)
*H02P 9/04* (2006.01)
*H02J 7/00* (2006.01)
(Continued)

(52) U.S. Cl.
CPC ............... *H02J 7/0068* (2013.01); *H02J 3/32* (2013.01); *H02J 3/38* (2013.01); *H02P 2009/004* (2013.01); *Y02E 70/30* (2013.01); *Y02E 10/723* (2013.01); *Y02E 10/763* (2013.01); *Y02E 10/766* (2013.01)

USPC ................. 290/50; 290/44; 320/101; 363/95; 705/412

(58) Field of Classification Search
USPC .......... 290/44, 50; 320/101; 363/95; 705/412
See application file for complete search history.

(56) References Cited

U.S. PATENT DOCUMENTS 7,193,872 B2 *  3/2007  Siri ................................. 363/95
7,324,361 B2 *  1/2008  Siri ................................. 363/95
(Continued)

FOREIGN PATENT DOCUMENTS

JP  2008-67418 A  3/2008
JP  2010-51117 A  3/2010
(Continued)

OTHER PUBLICATIONS

Korean Office Action dated May 27, 2014 (four (4) pages).
(Continued)

*Primary Examiner* — Pedro J Cuevas
(74) *Attorney, Agent, or Firm* — Crowell & Moring LLP

(57) ABSTRACT

For reducing a storage capacity of a storage battery system and an installation cost at a constant-output control type of wind power plant, a wind power generation control device sets as a planned generation power value PT: an average wind generated power value PA, when a current battery charging rate SOC of the storage battery system is within the range of the upper and lower limit values of the targeted battery charging rate range SOCT (S12); a value obtained by multiplying a positive constant greater than 1 to the said PA, when the current battery charging rate SOC is above the upper limit value of the said SOCT (S14): and a value obtained by multiplying a positive constant less than 1 to the said PA, when the current battery charging rate SOC is below the lower limit value of the said SOCT (S15).

15 Claims, 13 Drawing Sheets

(51) Int. Cl.
*H02J 3/32* (2006.01)
*H02J 3/38* (2006.01)
*F03D 9/00* (2006.01)
*H01M 10/44* (2006.01)
*H02P 9/00* (2006.01)

(56) References Cited

U.S. PATENT DOCUMENTS

| | | | |
|---|---|---|---|
| 7,855,467 B2 * | 12/2010 | Kawazoe et al. | 290/44 |
| 8,334,606 B2 * | 12/2012 | Oohara et al. | 290/44 |
| 8,575,886 B2 * | 11/2013 | Oohara et al. | 320/101 |
| 8,860,236 B2 * | 10/2014 | Nasiri | 290/44 |
| 2006/0171182 A1 * | 8/2006 | Siri et al. | 363/131 |
| 2007/0159866 A1 * | 7/2007 | Siri | 363/95 |
| 2008/0091590 A1 * | 4/2008 | Kremen | 705/38 |
| 2008/0091625 A1 * | 4/2008 | Kremen | 705/412 |
| 2008/0091626 A1 * | 4/2008 | Kremen | 705/412 |
| 2008/0179887 A1 * | 7/2008 | Kawazoe et al. | 290/44 |
| 2008/0191484 A1 * | 8/2008 | Okubo et al. | 290/44 |
| 2009/0295162 A1 * | 12/2009 | Oohara et al. | 290/44 |
| 2011/0089693 A1 * | 4/2011 | Nasiri | 290/44 |
| 2011/0193516 A1 * | 8/2011 | Oohara et al. | 320/101 |
| 2011/0245987 A1 * | 10/2011 | Pratt et al. | 700/295 |
| 2012/0200160 A1 * | 8/2012 | Pratt et al. | 307/48 |
| 2012/0228942 A1 * | 9/2012 | Nakashima et al. | 307/66 |
| 2012/0306202 A1 * | 12/2012 | Takahashi et al. | 290/44 |
| 2013/0119928 A1 * | 5/2013 | Partovi | 320/108 |
| 2013/0193928 A1 * | 8/2013 | Prosser | 320/130 |
| 2013/0268132 A1 * | 10/2013 | Pratt et al. | 700/286 |
| 2014/0172503 A1 * | 6/2014 | Hammerstrom et al. | 705/7.31 |

FOREIGN PATENT DOCUMENTS

| | | |
|---|---|---|
| JP | 2010-57262 A | 3/2010 |
| JP | 2011-229205 A | 11/2011 |

OTHER PUBLICATIONS

Technical Requirements on Frequency Change Control for Constant-Output Control Type of Wind Power Generation Equipment, Nov. 27, 2009 w/ English translation. (ten (10) pages).

* cited by examiner

FIG. 10 — Related Art —

WIND POWER GENERATION SYSTEM, WIND POWER GENERATION CONTROL DEVICE AND WIND POWER GENERATION CONTROL METHOD

CROSS REFERENCE TO RELATED APPLICATION

The present application claims benefit of the filing date of Japanese Patent Application No. JP2012/177788 filed on Aug. 10, 2012 which is incorporated herein by reference.

FIELD OF THE INVENTION

The present invention relates to a wind power generation system, a wind power generation control device, and a wind power generation control method, which are suitable for use at a wind power plant equipped with storage batteries.

DESCRIPTION OF RELATED ART

Depletion of fossil fuels such as oil has been a concern for years, and additionally as a countermeasure against warming of the global environment, reducing CO2 emissions has become an urgent issue to be resolved in the whole world. In order to solve these problems, as a method of power generation for which fossil fuels are unused and from which no CO2 is emitted, introduction of power generation using natural energy such as a solar power and a wind power is rapidly evolving worldwide.

However, especially as a wind power generation generates electricity using winds that change from moment to moment, it is characterized that generated power varies greatly over time. Therefore, when interconnecting a wind-generated power to the commercial power grid, there is a risk that, due to variations in a wind-generated power, the balance of power supply and demand is lost in the commercial power grid, and a problem such as a frequency variation occurs, which in turn causes degradation of the power quality.

Currently, when a wind-generated power is interconnected to the commercial power grid, the commercial power grid is keeping the balance of electric power supply and demand, by adjusting the power output of large generators such as thermal power plants in the power grid, depending on the magnitude of the power demand. However, in Japan, many wind power producers have already interconnected wind power generation equipments in the power grid, and the number of the producers tends to increase further, thus the lack of adjustment capability within the power grid is becoming a concern.

Therefore, wind power plants equipped with storage batteries have been developed, where a wind power generator group including one or more wind power generators is equipped with a storage battery system including one or more storage batteries and a control device for controlling charging and discharging of the storage batteries (e.g., see Japanese Patent Application Publication No. 2010-51117A and Japanese Patent Application Publication No. 2011-229205A). As the wind power plant equipped with storage batteries is capable of suppressing the variation of the power generated by the wind power generator group, by charging and discharging using a storage battery system, it is possible to transmit a stable power to the commercial power grid.

There is a constant-output control type of wind power plant to form one of the wind power plants equipped with storage batteries. For a constant-output control type of wind power plant, there are technical requirements for system interconnection from the power company to which the generated electric power is sold, such as (1) to submit a planned generation power value per unit of time in advance to the power company to which the generated electric power is sold and (2) to limit the variation of powers generated by the wind power plant per unit of time within plus or minus 2% of the rated power generation based on the planned power generation value submitted in advance. Further, when such technical requirements cannot be fulfilled, a penalty fee may have to be paid (e.g., see non-Patent document "Technical requirements for a countermeasure against frequency variation of a constant-output control type of wind power generation equipment").

Problems to be Solved by the Invention

However, a bar of technical requirements for system interconnection from the power company buying electricity is set substantially high for wind power producers, and there are some cases where it is impossible to gain a profit from selling electricity and to run a business on wind power generation. Incidentally, it is said that in order to achieve a constant-output control type of wind power station, a storage battery system of about 85% of the total power output by the wind power generator group is needed, and it means, for example, that a storage battery system of 34 MW is required for a wind power generator group of 40 MW. Therefore, an installation cost of a constant-output control type of wind power plant is about 1.8 to 1.9 times compared with that of a conventional wind power plant, which is expensive by a large margin.

In view of the problems of the prior art as described above, the present invention is intended to provide a wind power generation system, a wind power generation control device, and a wind power generation control method, which are capable of reducing a storage capacity of a storage battery system at a constant-output control type of wind power plant, and to reduce an installation cost thereof.

BRIEF SUMMARY OF THE INVENTION

The wind power generation system according to the present invention is configured to include: a wind power generator group composed of a plurality of wind power generators; a storage battery system composed of a plurality of batteries; and a wind power generation control device that performs a control so that a system generated power, obtained by adding a wind generated power generated by the wind power generator group and a charge-discharge power charged and discharged by the storage battery system, falls within the range of the planned generation power value set in advance, over the charge-discharge power.

Then, the wind power generation control device includes: an average value operation unit that calculates an average value of the wind generated power generated by the wind power generator group during a first control period before the present time; a targeted SOC range operation unit that calculates a targeted battery charging rate range of the storage battery system; and a planned generation power value operation unit that calculates a planned generation power value for a second control period which is set later than the present time, based on the average value of the wind generated power calculated by the average value operation unit, wherein the planned generation power value operation unit sets as the planned generation power value: the average value of the wind generated power, when a current battery charging rate of the storage battery system is in the range of the upper and lower limit values of the targeted battery charging rate range; a value obtained by multiplying a positive constant greater than 1 to the average value of the wind generated power, when a current battery charging rate of the storage battery system is above the upper limit value of the targeted battery charging rate range; and a value obtained by multiplying a positive constant less than 1 to the average value of the wind generated power, when a current battery charging rate of the storage battery system is below the lower limit value of the targeted battery charging rate range.

Effects of the Invention

According to the present invention, it is feasible to reduce a storage capacity of a storage battery system at a constant-output control type of wind power plant, and to reduce an installation cost thereof.

DETAILED DESCRIPTION OF PREFERRED EMBODIMENTS

Hereinafter, a detailed description will be given of embodiments of the present invention, with reference to the drawings.

First Embodiment

Figure 1:
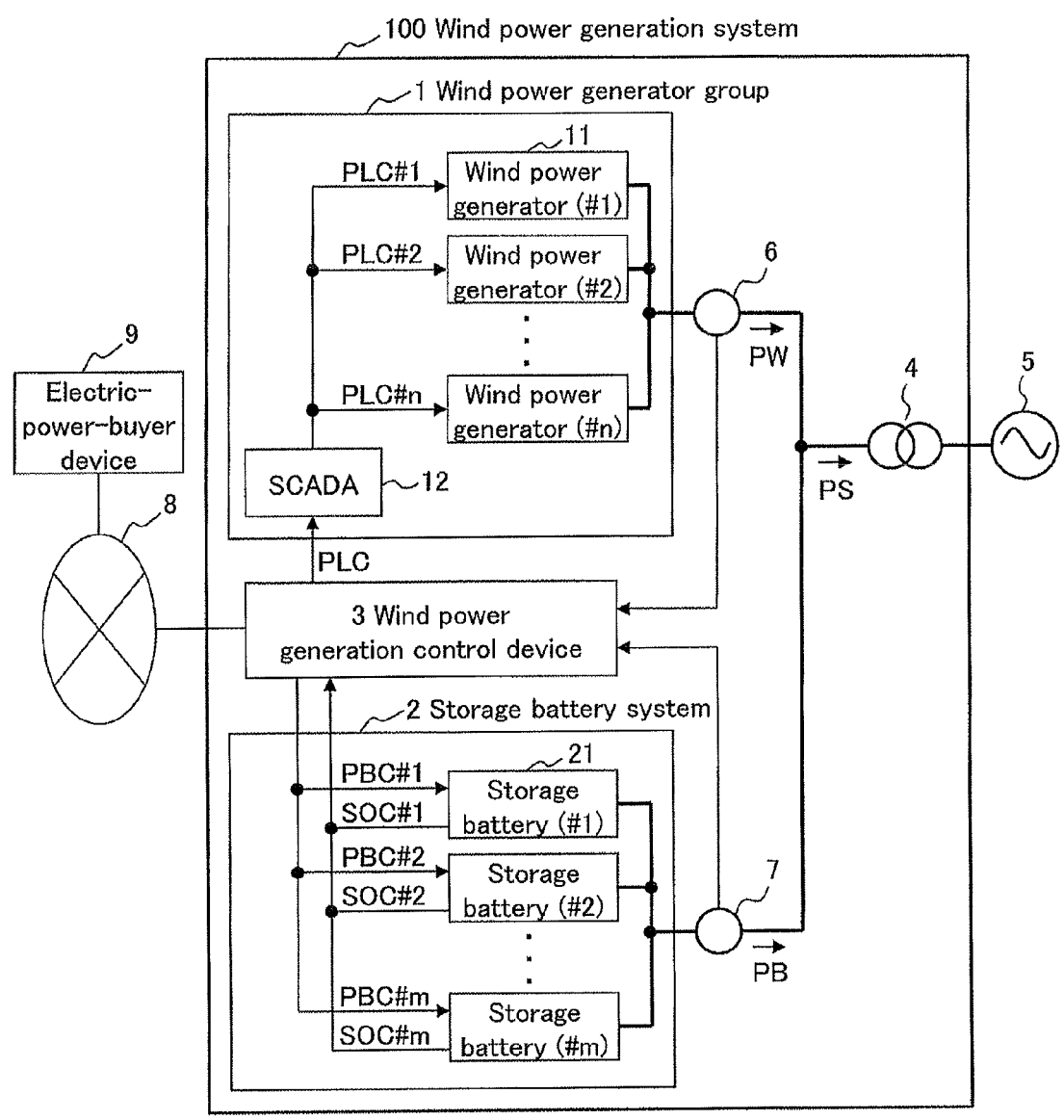
FIG. 1 is a diagram showing a configuration example of a wind power generation system according to the first embodiment of the present invention.

FIG. 1 is a diagram showing a configuration example of a wind power generation system 100 according to a first embodiment of the present invention. As shown in FIG. 1, the wind power generation system 100 is configured to include a wind power generator group 1, a storage battery system 2, a wind power generation control device 3, and an interconnection transformer 4, interconnecting with a power grid 5 of a utility to which the power is sold, via the interconnection transformer 4, and transmitting a system generated power PS to the power grid 5.

At this time, a power meter 6 is installed at the interconnection point of the wind power generator group 1, for measuring the wind generated power PW generated by the wind power generator group 1, and a power meter 7 is installed at the interconnection point of the storage battery system 2, for measuring the charge-discharge power PB. In addition, the wind power generation control device 3 is connected, via a communication network 8, to an electric-power-buyer device 9.

Here, the system generated power PS generated by the wind power generation system 100 is the sum of the wind generated power PW generated by the wind power generator group 1 and the charge-discharge power PB charged and discharged by the storage battery system 2. Thus, there is a relationship of PS=PW+PB between these three.

Note that the charge-discharge power PB is assumed to be a positive value when the power is discharged from the storage battery system 2, while a negative value when the power is charged to the storage battery system 2.

As shown in FIG. 1, the wind power generator group 1 is configured to include one or more wind power generators 11 (#1, #2, - - -, #n) and a SCADA (Supervisory Control And Data Acquisition) 12.

The wind power generators 11 (#1, #2, - - -, #n) are assumed to be configured with a DC-excited synchronous power generator, an AC-excited synchronous power generator, a permanent magnet synchronous power generator, or the like, any of which is provided with a power transducer as well as a control mechanism for the pitch angle of the blades, and capable of a variable-speed operation. Then, when the generation power limiting commands PLC #1, PLC #2, - - -, PLC #n are inputted to the wind power generators 11 (#1, #2, . . . , # n) respectively, the respective wind power generators 11 (#1, #2, - - -, #n) limit the generating power less than or equal to the respective generation power limiting commands PLC #1, PLC #2, - - -, PLC #n, using the control mechanism for the pitch angle provided therewith.

In addition, upon receiving the generation power limiting command PLC for the wind power generator group 1 as a whole from the wind power generation control device 3, the SCADA 12 divides the received generation power limiting command PLC into the generation power limiting commands PLC #1, PLC #2, - - -, PLC #n for the respective wind power generators 11 (#1, #2, - - -, #n), then distributes the divided generation power limiting commands PLC #1, PLC #2, - - -, PLC #n to the respective wind power generators 11 (#1, #2, - - -, #n).

It should be noted that, when performing a division and a distribution, a relationship below need to be satisfied.

$$PLC\ \#1+PLC\ \#2+\text{- - -}+PLC\ \#n \leq PLC$$

Thus, the wind power generator group 1 can limit the wind generated power PW less than or equal to the generation power limiting command PLC transmitted from the wind power generation control device 3. That is, as the wind power generator group 1 can limit excessive rises in the output of the wind generated power PW, charging requirements of excessive powers to the storage battery system 2 are suppressed. Therefore, it is possible to reduce the rating of the storage battery system 2.

Subsequently, a description will be given of the configuration of the storage battery system 2. As shown in FIG. 1, the storage battery system 2 is configured with one or more storage batteries 21 (#1, #2, - - -, #m). A detailed configuration of the storage battery 21 will be described below with reference to FIG. 2.

Figure 2:
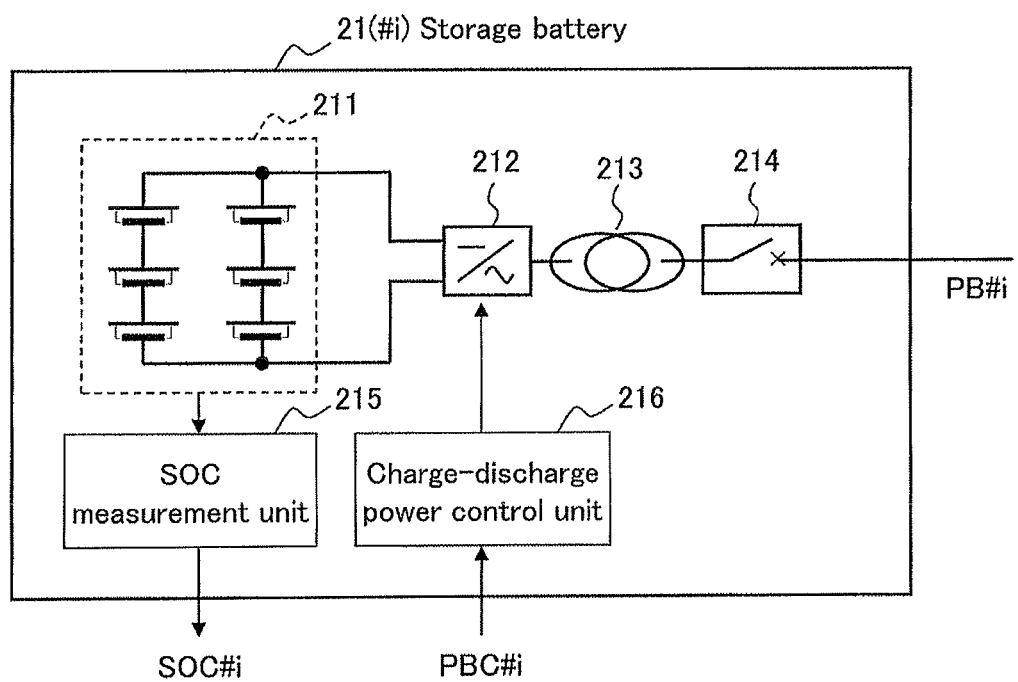
FIG. 2 is a diagram showing an example of a detailed configuration of a storage battery.

FIG. 2 is a diagram showing an example of a detailed configuration of the storage battery 21. As shown in FIG. 2, the i-th storage battery 21 (#i) in the storage battery system 2 in FIG. 1 is configured to include a rechargeable secondary battery 211, a DC/AC converter 212, an interconnection transformer 213, a breaker 214, an SOC measurement unit 215, and a charge-discharge power controller 216. Here, i=1, 2, - - -, m (hereinafter the same shall apply). Note that an SOC (State of Charge) means a battery charging rate.

By controlling the DC/AC converter 212 according to a charging-discharging power command PBC #i from the wind power generation control device 3, the charge-discharge power control unit 216 charges the secondary battery 211 with a part of the wind generated power PW generated by the wind power generator group 1, or discharges a power stored in the secondary battery 211. Note that a charged or discharged power at this time is represented by PB #i in FIG. 2. In addition, at the same time, the SOC measurement unit 215 measures the battery charging rate SOC #i of the secondary battery 211, and transmits the measured battery charging rate SOC #i to the wind power generation control device 3.

Here, the secondary battery 211 is configured with any one or combination of a lead battery, a sodium-sulfur battery, a redox flow battery, a lithium-ion battery, a nickel hydrogen battery, and a lithium-ion capacitor. Note that a power storage device used as the storage battery 21 is not limited to the secondary battery 211, and may be formed with an electric double layer capacitor, a combination of the secondary battery 211 and the electric double layer capacitor, or a combination of other power storage components, instead of the secondary battery 211. Further, as the power storage device to replace the secondary battery 211, something to store electrical energy as kinetic energy such as flywheels may be also used.

Figure 3:
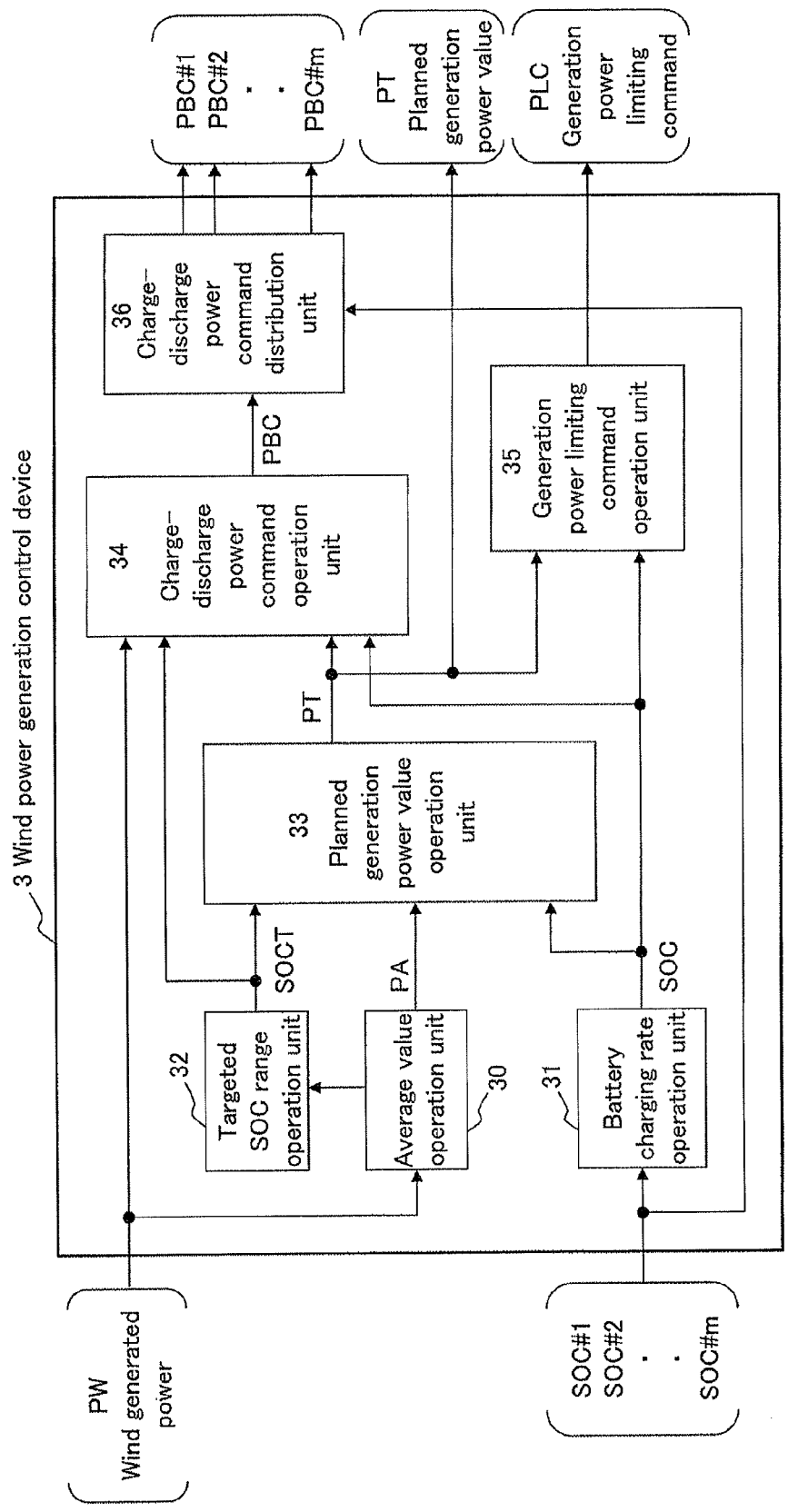
FIG. 3 is a diagram showing an example of a block diagram of a wind power generation control device.

FIG. 3 is a diagram showing an example of a block diagram of the wind power generation control device 3. As shown in FIG. 3, the wind power generation control device 3 is configured to include blocks such as an average value operation unit 30, a battery charging rate operation unit 31, a targeted SOC range operation unit 32, a planned generation power value operation unit 33, a charge-discharge power command operation unit 34, a generation power limiting command operation unit 35, and a charge-discharge power command distribution unit 36.

The wind power generation control device 3 obtains the wind generated power PW generated by the wind power generator group 1 via the power meter 6, as well as the respective battery charging rates SOC #1, SOC #2, - - -, SOC #m from the individual storage batteries 21 (#1, #2, - - -, #m) that make up the storage battery system 2. Then, as well as calculating the planned generation power value PT based on the obtained wind generated power PW and battery charging rates SOC #1, SOC #2, - - -, SOC # m, the wind power generation control device 3 calculates the charge-discharge power commands PBC #1, PBC #2, - - -, PBC #m for the respective storage batteries 21 (#1, #2, - - -, #m), and the generation power limiting command PLC for the wind power generator group 1.

At this time, the charge-discharge power command PBC #1, PBC #2, - - -, PBC #m outputted from the wind power generation control device 3 are inputted to the associated storage batteries 21 (#1, #2, - - -, #m), respectively, the generation power limiting command PLC is inputted to the SCADA 11 of the wind power generator group 1, and the planned generation power value PT is transmitted to the electric-power-buyer device 9 via the communication network 8.

Hereinafter, a description will be given sequentially of the function of each functional block constituting the wind power generation control device 3, with reference to FIG. 3 (see FIGS. 1, 2 also as appropriate). It should be noted that the wind power generation control device 3 having the function as described below may be embodied by configuring each block with a dedicated hardware control circuit, configuring a part of blocks with one or more microprocessors, or configuring the whole blocks with one or more computers.

<1: Average Value Operation Unit>

The average value operation unit 30 obtains the wind generated power PW which is momently generated by the wind power generator group 1, via the power meter 6 for the period from a specific time before the present time up to the present time, and calculates the average generated power value PA by time averaging the obtained wind generated power PW, then transmits the calculation result of the average generated power value PA to the planned generation power value operation unit 33.

Note that in the following description, a unit of time (duration) for a wind power generation control that obtains the wind generated power PW and calculates the average generated power value PA is referred to as an operation period.

<2: Battery Charging Rate Operation Unit>

The battery charging rate operation unit 31 calculates the battery charging rate SOC of the storage battery system 2 as a whole, based on the respective battery charging rates SOC #1, SOC #2, - - -, SOC #m obtained from the storage batteries 21 (#1, #2, - - -, #m) that constitute the storage battery system 2.

<3: Targeted SOC Range Operation Unit>

The targeted SOC range operation unit 32 sets the targeted charging rate value for the storage battery system 2, based on the average generated power value PA that is calculated by the average value operation unit 30, and further, by adding or subtracting a value equivalent to 2% of the battery charging rate SOC as a dead band, for example, calculates a targeted charging rate range SOCT. Therefore, the targeted charging rate range SOCT is information indicating a range having the upper limit value of the targeted charging rate value plus the dead band, and the lower limit value of the targeted charging rate value minus the dead band.

Here, the targeted charging rate value of the storage battery system 2 is assumed to be calculated using a function formula, a table, or the like, as a value which depends on the average generated power value PA (average value of the wind generated power PW). In this case, the targeted charging rate value is calculated to be a relatively high value when the average generated power value PA is large, and calculated to be a relatively small value when the average generated power value PA is small.

Incidentally, when the wind generated power PW is large, for example, when the wind power generator group 1 is continuously generating the wind generated power PW close to the rated generation power, the wind generated power PW will be more likely decreased rather than increased. Then, in such a case, by setting the targeted charging rate value relatively high, it is possible to secure a relatively large amount of discharging power from the storage battery system 2, in preparation for a case when the wind generated power PW decreases.

Also, when the wind generated power PW is small, for example, when the wind generated power PW by the wind power generator group 1 is continuously almost zero due to still air, the wind generated power PW will be more likely increased rather than to be decreased. Then, in such a case, by setting the targeted charging rate value relatively small, it is possible to secure a relatively large amount of charging power to the storage battery system 2, in preparation for a case when the wind generated power PW increases.

As described above, the targeted charging rate value of the storage battery system 2 is normally defined as a value dependent on the wind generated power PW (i.e., average generated power value PA), but may be a fixed value that is independent of the wind generated power PW.

It should be noted that in the present embodiment, as described above, with respect to the targeted charging rate value of the storage battery system 2, a range obtained by adding or subtracting a value equivalent to 2% of the battery charging rate SOC, for example, as a dead band is made as the targeted charging rate range SOCT. The purpose of making the range inclusive of the dead band as the targeted charging rate range SOCT is to prevent chattering of the battery charging rate SOC at the storage battery system 2.

That is, when the battery charging rate SOC of the storage battery system 2 is within the targeted charging rate range SOCT, as there is no need to regulate the battery charging rate SOC, it becomes unnecessary to make the battery charging rate SOC to follow the targeted charging rate value little by little, by charging and discharging the storage battery system 2 little by little. In other words, the chattering of the battery charging rate SOC will be prevented.

It should be noted that a small width of the dead band in the targeted charging rate range SOCT will increase the frequency of chattering of the battery charging rate SOC near at the upper or lower limit values. Also, as a large width of the dead band decreases the frequency of charging and discharging of the storage battery system 2, there is a risk that the charge-discharge power PB of the storage battery system 2 fails to absorb the fluctuation of the wind generated power PW. Therefore, the width of the dead band in the battery charging rate SOC is desirably about plus or minus 1 to 2% of the rated generation power of the wind power generation system 100.

<4: Planned Generation Power Value Operation Unit>

The planned generation power value operation unit 33 calculates the planned generation power value PT, based on the average generated power value PA calculated by the average value operation unit 30, the targeted charging rate range SOCT calculated by the targeted SOC range operation unit 32, and the battery charging rate SOC calculated by the battery charging rate operation unit 31. The planned generation power value PT above is a power to be generated by the wind power generation system 100 (system generated power PS) during a promised period, which comes later than the present time after the elapse of a follow-up control period.

Here, the follow-up control period is a period of time set in advance in order to secure a time required for a large generator to start, stop or control a power output, where a large generator is located at a thermal power plant or the like which adjusts a power in the power grid 5 to which the electric power is sold. Therefore, the follow-up control period need to be specified with a longer time than a response time of the adjustment for the power grid 5. However, as the follow-up control period longer than necessary causes an increase in the difference between the planned generation power value PT and the actual wind generated power PW, the follow-up control period is desirably 1 to 2 hours.

In addition, the promised period is a period of time during which the wind power generation system 100 is promised for the electric power buyer to generate the system generated power PS and transfer this to the power grid 5 of the electric power buyer, where the system generated power PS has a follow-up control performed over the planned generation power value PT, which was noticed to the electric power buyer via the electric-power-buyer device 9. Here, the longer the promised period is, the more stable the balance between the supply and demand on power is kept, since the interval for adjusting the output at a thermal power plant or the like can be prolonged for the power grid 5 to which the electric power is sold.

On the other hand, at the wind power generation system 100 side, the longer the promised period is, the greater the charge-discharge capacity is required for the storage battery system 2, considering the variation of the wind, since the system generated power PS need to be generated to follow up the same planned generation power value PT for a longer period of time. As this means that the size of the storage battery system 2 need to be increased, prolonging the promised period leads to increased installation cost of the wind power generation system 100. Therefore, the promised period is desirably about 30 to 60 minutes.

Note that the details will be given separately of the operation process in the planned generation power value operation unit 33, with reference to FIGS. 4-7. In addition, the meaning of the terms such as the operation period, the follow-up control period, and the promised period in the above description should be easily understood by referring to FIGS. 5-7.

<5: Charge-Discharge Power Command Operation Unit>

The charge-discharge power command operation unit 34 calculates the charge-discharge power command PBC for the entire storage battery system 2, based on the wind generated power PW generated by the wind power generator group 1, the targeted charging rate range SOCT calculated by the targeted SOC range operation unit 32, the planned generation power value PT calculated by the planned generation power value operation unit 33, and the battery charging rate SOC calculated by the battery charging rate operation unit 31, and then sends the calculated charge-discharge power command PBC to the charge-discharge power command distribution unit 36.

It should be noted that the charge-discharge power command PBC above is calculated so that the charge-discharge power PB, charged and discharged by the entire storage battery system 2 based on the charge-discharge power command PBC, compensates variations of the wind generated power PW in time, thus making the system generated power PS, a sum of the wind generated power PW and the charge-discharge power PB, approximately equal to the planned generation power value PT.

<6: Generation Power Limiting Command Operation Unit>

The generation power limiting command operation unit 35 calculates a generation power limiting command PLC for the wind power generator group 1, based on the planned generation power value PT calculated by the planned generation power value operation unit 33, the battery charging rate SOC calculated by the battery charging rate operation unit 31, and the chargeable power calculated with the battery charging rate SOC, and then sends the calculated generation power limiting command PLC to the SCADA 12.

Figure 8:
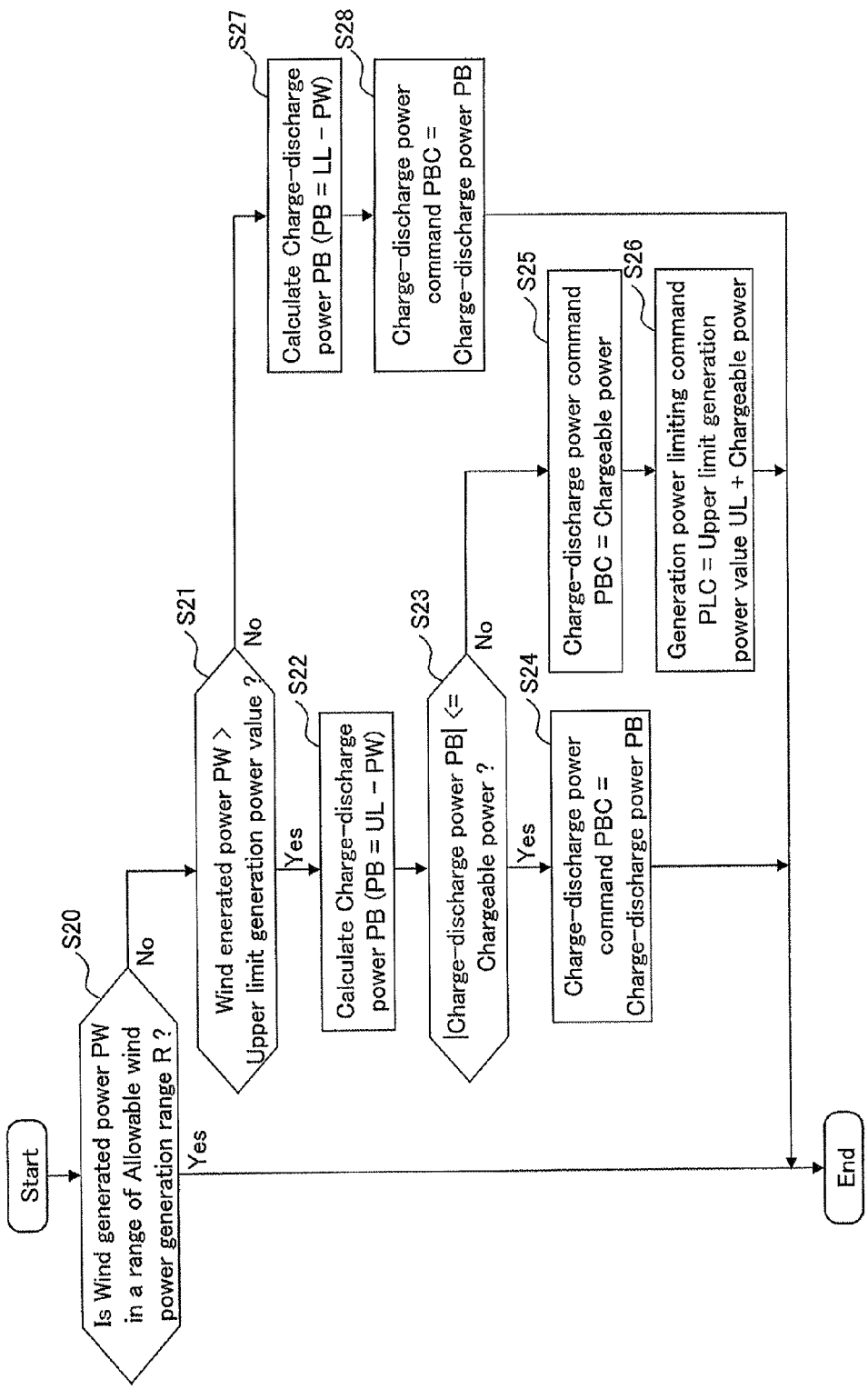
FIG. 8 is an example process flow of a planned power generation value follow-up control by a charge-discharge power command operation unit and a generation power limiting command operation unit.

Note that the detailed description will be separately given of the operation process in the charge-discharge power command operation unit 34 and the generation power limiting command operation unit 35, with reference to FIG. 8.

<7: Charge-Discharge Power Command Distribution Unit>

The charge-discharge power command distribution unit 36 divides the charge-discharge power command PBC calculated by the charge-discharge power command operation unit 34 into the charge-discharge power commands PBC #1, PBC #2, - - -, PBC #m for the storage batteries 21 (#1, #2, - - -, #m), respectively, and then outputs the divided charge-discharge power commands PBC #1, PBC #2, - - - , PBC #m to the storage batteries 21 (#1, #2, - - - , #m). Upon distributing the charge-discharge power command PBC, the charge-discharge power command distribution unit 36 classifies the storage batteries 21 (#1, #2, - - -, #m) into one or more groups, for example, and controls the battery charging rate of the storage batteries 21 individually for each of the classified groups. At that time, all the storage batteries 21 in the same group may be controlled so as to have the same battery charging rate, or the storage batteries 21 in the same group may be managed and controlled independently.

Note that, in the process of distributing the charge-discharge power command PBC at this time, the charge-discharge power commands PBC #1, PBC #2, - - -, PBC #m are calculated so that the respective battery charging rates SOC #1, SOC #2, - - - , SOC #m of the storage batteries 21 (#1, #2, - - -, #m) after distribution have approximately the same value. In addition, in the process of distribution, it is assumed that the relation of PBC=PBC #1+PBC #2+ - - - +PBC #m is satisfied.

Figure 4:
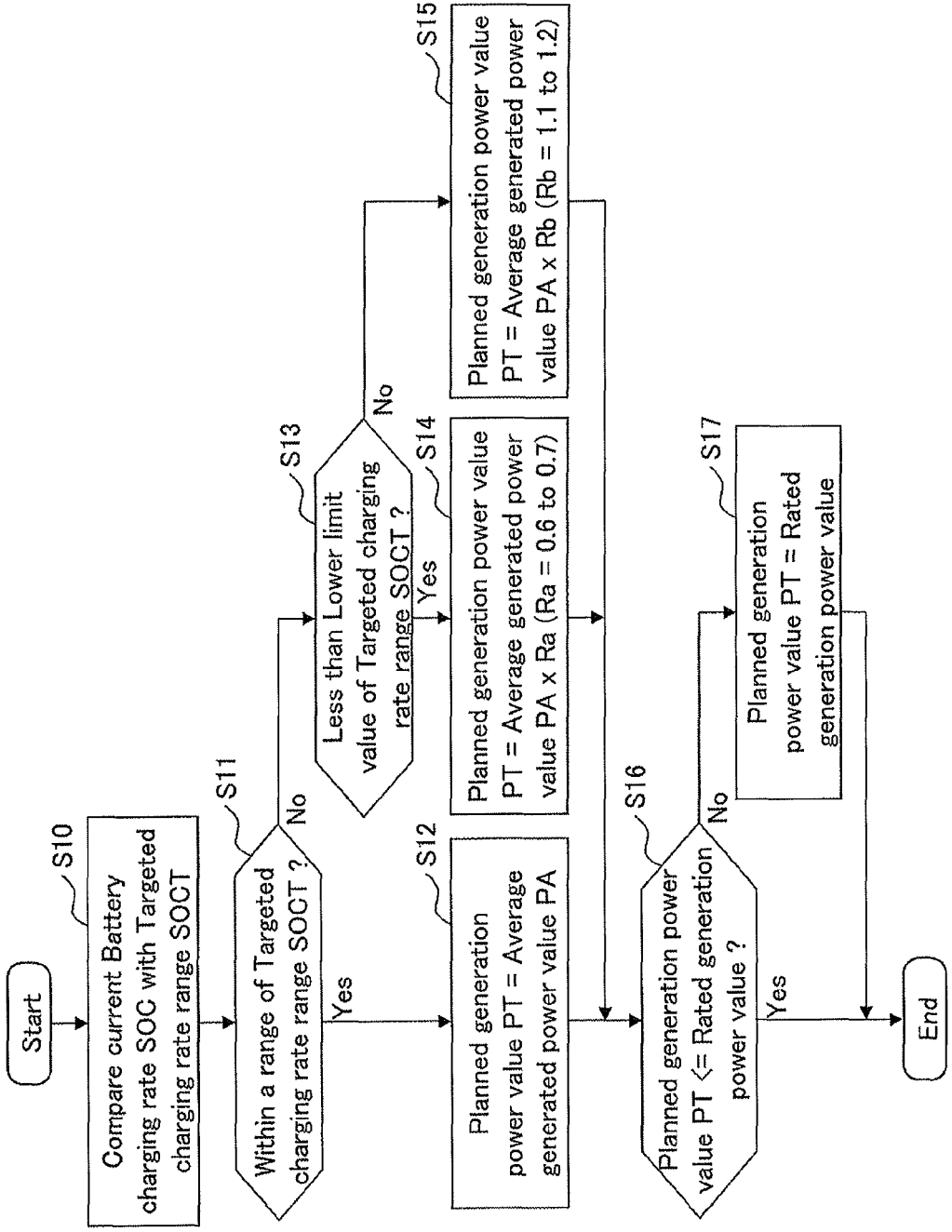
FIG. 4 is a flowchart showing an example processing of a planned power generation value operation by the planned power generation value operation unit.

FIG. 4 is a diagram showing an example of the planned generation power value operation process flow in the planned generation power value operation unit 33. As shown in FIG. 4, the planned generation power value operation unit 33 first compares the current battery charging rate SOC of the storage battery system 2, calculated by the battery charging rate operation unit 31, with the targeted charging rate range SOCT calculated by the targeted SOC range operation unit 32 (step S10).

As a result of the comparison, if the battery charging rate SOC is in the range of the targeted charging rate range SOCT (Yes at step S11), the planned generation power value operation unit 33 sets the average generated power value PA as the planned generation power value PT (step S12).

In addition, if the current battery charging rate SOC is less than the lower limit value of the targeted charging rate range SOCT (Yes at step S13), the planned generation power value operation unit 33 sets a value, obtained by multiplying a positive constant Ra less than 1 to the average generated power value PA, as the planned generation power value PT (step S14). Note that the value of Ra is desirably about 0.6 to 0.7, as will be described later.

Further, if the current battery charging rate SOC is neither within the range of the targeted charging range SOCT (No at step S11), nor less than the lower limit value of the targeted charging rate range SOCT (No at step S13), that is, if the current battery charging rate SOC exceeds the upper limit value of the targeted charging rate range SOCT, the planned generation power value operation unit 33 sets a value, obtained by multiplying a positive constant Rb greater than 1 to the average generated power value PA, as a planned generation power value PT (step S15). Note that the value of Rb is desirably about 1.1 to 1.2, as will be described later.

After calculating the planned generation power value PT as described above, the planned generation power value operation unit 33 determines whether or not the calculated planned generation power value PT is less than or equal to the rated generation power value of the wind power generation system 100 (step S16). And, if the planned generation power value PT is less than or equal to the rated generation power value of the wind power generation system 100 (Yes at step S16), the planned generation power value operation unit 33 ends the planned generation power value operation process instantly. Alternatively, if the planned generation power value PT exceeds the rated generation power value of the wind power generation system 100 (No at step S16), the planned generation power value operation unit 33 resets the planned generation power value PT with the rated generation power value (reset) (step S17), and then ends the planned generation power value operation process.

Figure 5:
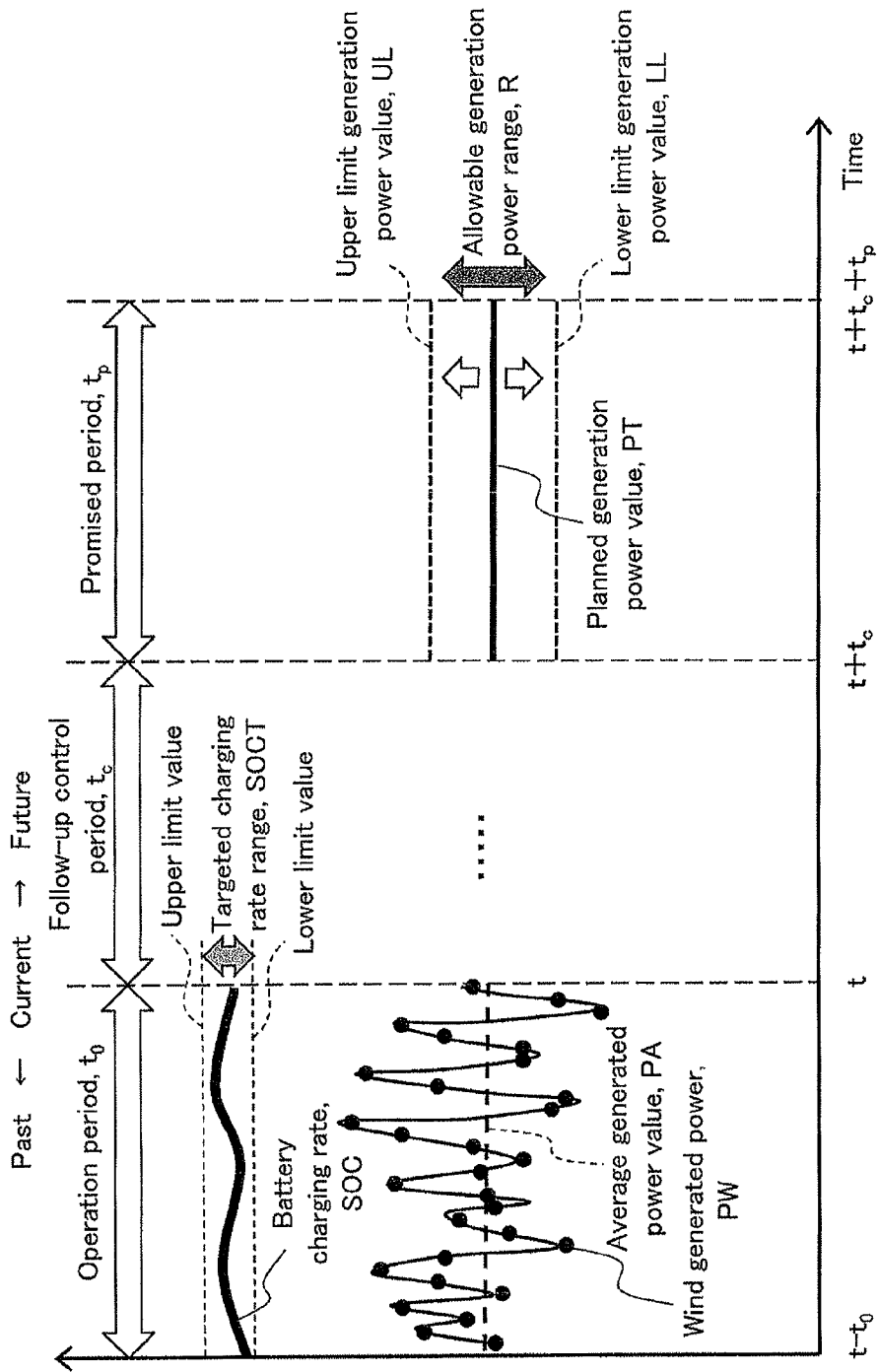
FIG. 5 illustrates a relationship between an average generated power value PA and a planned generation power value PT, when the current battery charging rate SOC is within the range of the targeted charging rate range SOCT.
Figure 6:
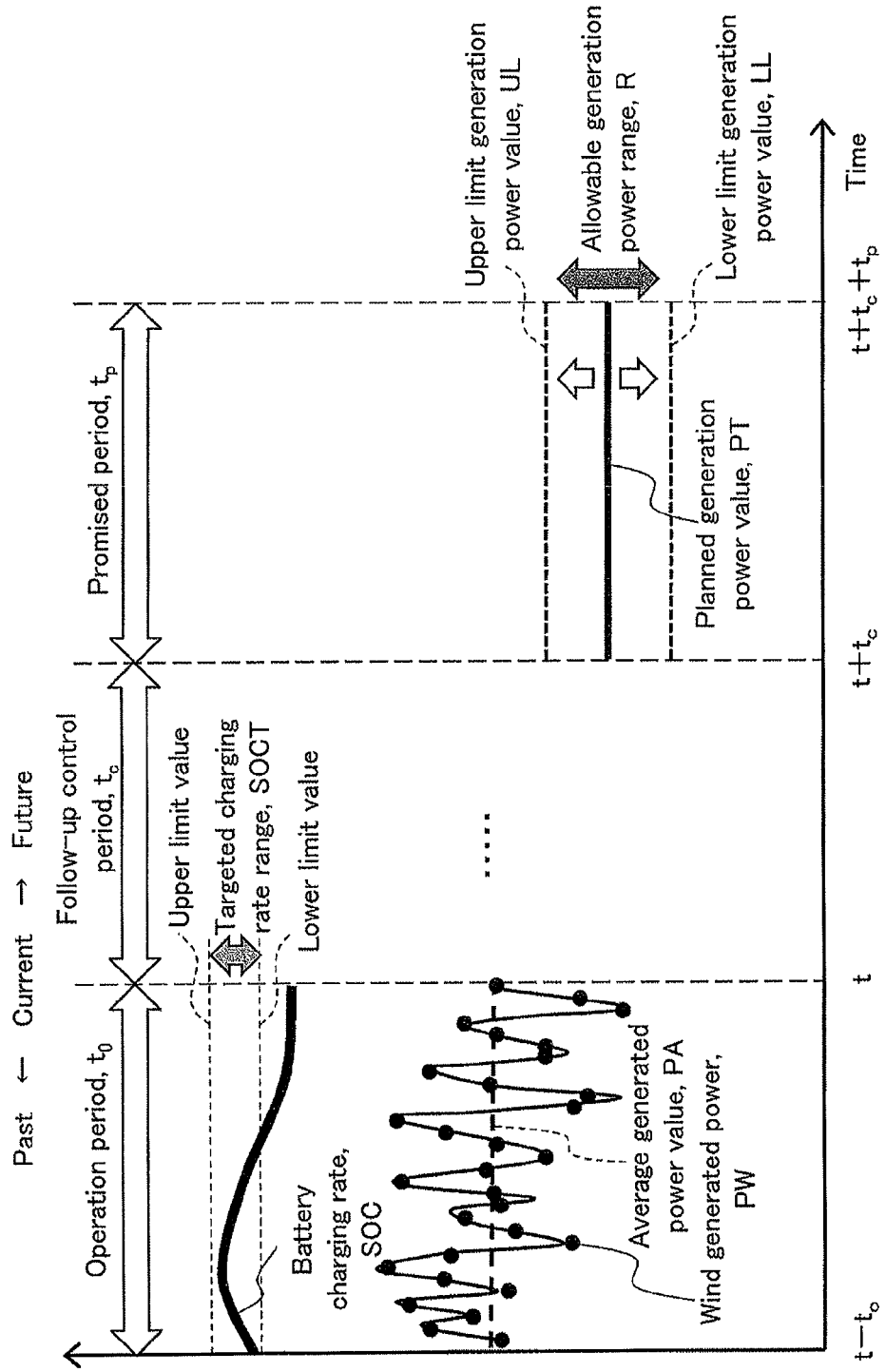
FIG. 6 illustrates a relationship between an average generated power value PA and a planned generation power value PT, when the current battery charging rate SOC is below the lower limit value of the targeted charging rate range SOCT.

Subsequently, with reference to FIGS. 5-7, a description will be given of significance of calculating the planned generation power value PT by dividing into cases based on the current battery charging rate SOC. Here, FIG. 5 is a diagram showing a relationship between the average generated power value PA and the planned generation power value PT, when the current battery charging rate SOC is within the targeted charging rate range SOCT. In addition, FIG. 6 is a diagram showing a relationship between the average generated power value PA and the planned generation power value PT, when the current battery charging rate SOC is less than the lower limit value of the targeted charging rate range SOCT. Further, FIG. 7 is a diagram showing a relationship between the average generated power value PA and the planned generation power value PT, when the current battery charging rate SOC exceeds the upper limit value of the targeted charging rate range SOCT.

Figure 7:
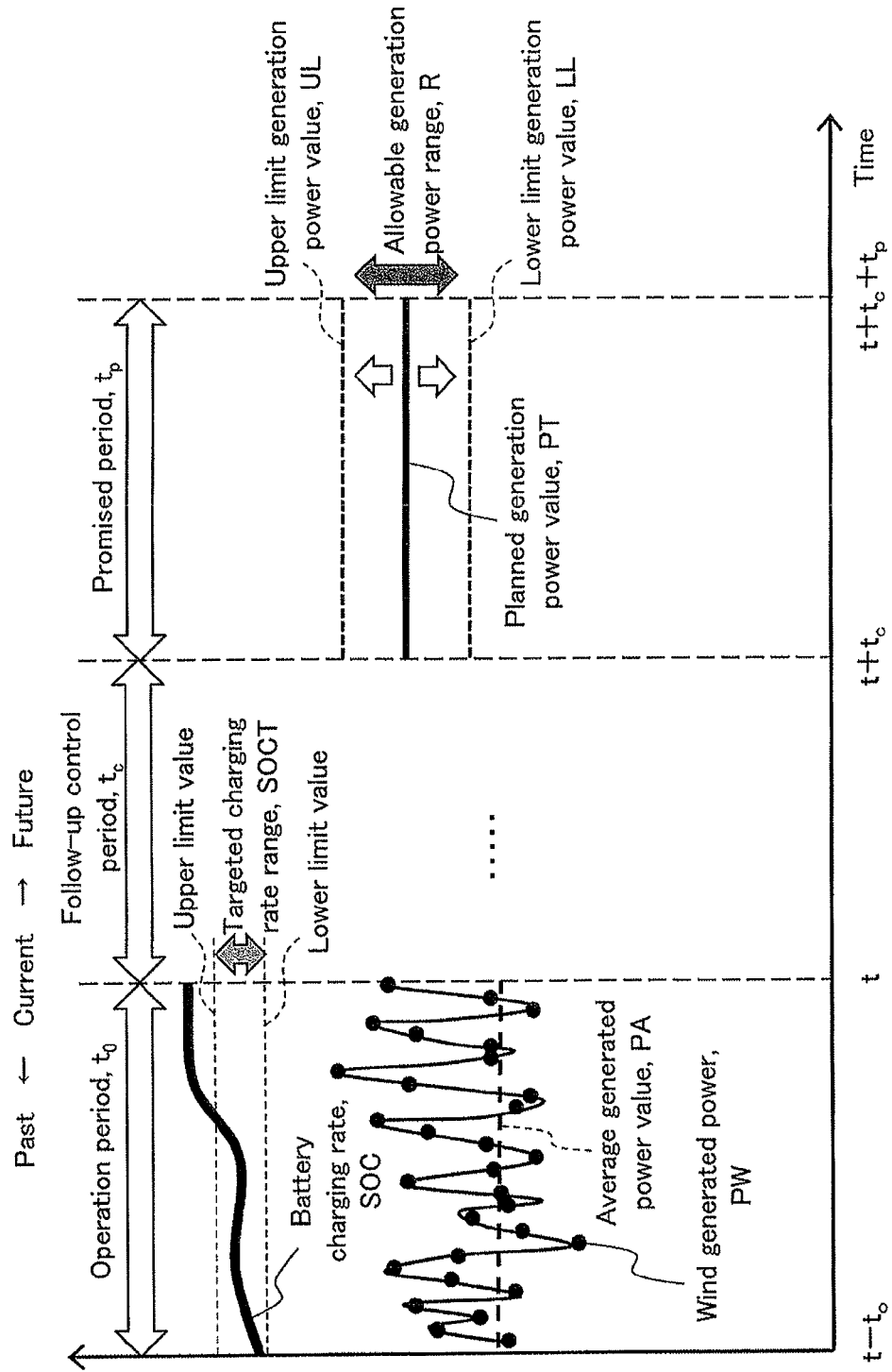
FIG. 7 illustrates a relationship between an average generated power value PA and a planned generation power value PT, when the current battery charging rate SOC is above the upper limit value of the targeted charging rate range SOCT.

In FIGS. 5-7, those represented in common are current time with t, the operation period with a period of time $t_o$, the follow-up control period with a period of time $t_c$, and the promised period with a period of time $t_p$.

As shown in FIGS. 5-7, the operation period refers to the period of time from the time before the present time "$t-t_o$" to the time t (current). The wind power generation control device 3 obtains the momently changing wind generated power PW during the operation period, and calculates the average generated power value PA. Also, by obtaining the battery charging rates SOC #1, SOC #2, - - - , SOC #m, respectively, from the storage batteries 21 (#1, #2, - - -, #m), the wind power generation control device 3 calculates the battery charging rate SOC and the targeted charging rate range SOCT.

Further, the planned generation power value PT during the promised period (from time "$t+t_c$" to time "$t+t_c+t_p$") will be described with reference to FIG. 4, and as will be described below also, the magnitude relationship between the battery charging rate SOC and the targeted charging rate range SOCT will be divided into cases, and then calculations will be made for each of the cases.

In case of FIG. 5, the current (time t) battery charging rate SOC is in the range between the upper and lower limit values of the targeted charging rate range SOCT (corresponding to the case of Yes at step S11 in FIG. 4). In this case, as the battery charging rate SOC is determined to be appropriate, increasing or decreasing the battery charging rate SOC will be eliminated.

Here, assuming that wind conditions in the operation period will similarly continue in the promised period, the average value of the wind generated power PW in the promised period is expected to be at the same level as that of the average generated power PA in the operation period. Therefore, the wind power generation control device 3 sets the average generated power PA during the operation period as the planned generation power value PT during the promised period (corresponding to step S12 in FIG. 4). That way, the battery charging rate SOC is expected to fall within the range of the targeted charging rate range SOCT, also in the promised period.

In case of FIG. 6, the current (time t) battery charging rate SOC is below the lower limit value of the targeted charging rate range SOCT (corresponding to the case of Yes at step S13 in FIG. 4). In this case, as the battery charging rate SOC is determined to be below the appropriate range, the charging power to the storage battery system 2 will need to be increased for raising the battery charging rate SOC up to an appropriate range.

Here, assuming that wind conditions in the operation period will similarly continue in the promised period, the average value of the wind generated power PW in the promised period is expected to be at the same level as that of the average generated power PA in the operation period. Therefore, the wind power generation control device 3 sets a value, obtained by multiplying the positive constant Ra less than 1 to the average generated power value PA obtained in the operation period, as the planned generation power value PT in the promised period (corresponding to step S14 in FIG. 4).

In this case, as the planned generation power value PT in the promised period becomes smaller than the average generated power value PA in the operation period, the system generated power PS to be transferred to the power grid 5 of the electric power buyer will be also decreased (to follow the planned generation power value PT). Accordingly, in this promised period, as the wind generated power PW from the wind power generator group 1 exceeds the system generated power PS to be transferred to the power grid 5 of the electric power buyer, the storage battery system 2 will be charged with the excess power for raising the battery charging rate SOC.

However, if the constant Ra is too small, the planned generation power value PT becomes excessively small. In this case, the wind power generator group 1 generates an excess power over the charging power required to increase the battery charging rate SOC of the storage battery system 2 to the targeted charging rate range SOCT, but the excess power is discarded by a power control (such as a pitch angle control) at the wind power generator 11. This means that the losing generated power increases, in other words, earnings from power sales decreases, which in turn puts the existence of the power generation business at risk. Therefore, the constant Ra is desirably not too small and about 0.6 to 0.7.

In case of FIG. 7, the current (time t) battery charging rate SOC is above the upper limit value of the targeted charging rate range SOCT (corresponding to the case of No at step S13 in FIG. 4). In this case, as the battery charging rate SOC is determined to exceed the appropriate range, the discharge power from the storage battery system 2 will need to be increased for lowering the battery charging rate SOC down to an appropriate range.

Here, assuming that wind conditions in the operation period will similarly continue in the promised period, the average value of the wind generated power PW in the promised period is expected to be at the same level as that of the average generated power PA in the operation period. Therefore, the wind power generation control device 3 sets a value, obtained by multiplying the positive constant Rb greater than 1 to the average generated power value PA obtained in the operation period, as the planned generation power value PT in the promised period (corresponding to step S15 in FIG. 4).

In this case, as the planned generation power value PT in the promised period becomes greater than the average generated power value PA in the operation period, the system generated power PS to be transferred to the power grid 5 of the electric power buyer will be increased (to follow the planned generation power value PT). Accordingly, in this promised period, as the wind generated power PW from the wind power generator group 1 becomes less than the system generated power PS to be transferred to the power grid 5 of the electric power buyer, the lacking power will be supplemented with the discharging power from the storage battery system 2. Therefore the battery charging rate SOC of the storage battery system 2 can be lowered.

However, if the constant Rb is too large, the planned generation power value PT becomes excessively large. In this case, as the discharge power from the storage battery system 2 increases, a situation is liable to occur where the battery charging rate SOC of the storage battery system 2 is depleted promptly, inhibiting the storage battery system 2 to be used. Therefore, the constant Rb is desirably not too large and about 1.1 to 1.2.

It should be noted that Ra and Rb are made to be constants in the above description, but Ra and Rb need not be limited to constants. Ra and Rb may be, for example, values to be determined depending on either the amount of difference between the current battery charging rate SOC and the lower limit value of the targeted charging rate range SOCT, or the amount of difference between the current battery charging rate SOC and the upper limit value of the targeted charging rate range SOCT.

As described above, in the present embodiment, a determination is made whether or not the current battery charging rate SOC is in the range of the targeted charging rate range SOCT, that is, in the appropriate range of the battery charging rate SOC, and if it is not in the appropriate range, the planned generation power value PT in the promised period is determined based on the magnitude relationship with the appropriate range of the battery charging rate SOC, for pulling the battery charging rate SOC back into an appropriate range. Therefore, in the wind power generation system 100 according to the present embodiment, the battery charging rate SOC of the storage battery system 2 can be kept stable within a range not far from the appropriate range (targeted charging rate range SOCT).

After calculating the planned generation power value PT in the promised period in the manner described above, the wind power generation control device 3 performs a control to make the system generated power PS in the promised period follow the planned generation power value PT. According to the basic follow-up control, the wind power generation control device 3 charges the storage battery system 2 with over-generated power, when the wind generated power PW generated by the wind power generator group 1 is greater than the planned generation power value PT, and replenishes the power shortage with the discharge power from the storage battery system 2, when the wind generated power PW is smaller than the planned generation power value PT. Note that the detailed control will be described with reference to FIG. 8.

Incidentally, in the control of making the system generation power PS to follow the planned generation power value PT, the system generated power PS is allowed, for example, to have a variation of plus or minus 2% relative to the planned generation power value PT. That is, as shown in FIGS. 5-7, the wind power generation system 100 can generate and transmits a power to the power grid 5 of the electric power buyer, in the range between an upper limit generation power value UL (e.g., planned generation power value PT×1.02) and a lower limit generation power value LL (e.g., planned generation power value PT×0.98) provided for the planned generation power value PT.

It should be noted that the allowable variation range of the system generated power PS, which defines the upper limit generation power value UL and the lower limit generation power value LL, is intended to be determined by an agreement with the electric power buyer, or the like, and not limited to plus or minus 2% of the planned generation power value PT.

FIG. 8 is a diagram showing an example process flow of the planned generation power value follow-up control in the charge-discharge power command operation unit 34 and the generation power limiting command operation unit 35. As shown in FIG. 8, the planned generation power value follow-up control process is practically nothing but calculating the charge-discharge power command PBC and the generation power limiting command PLC.

First, the charge-discharge power command operation unit 34 determines whether or not the wind generated power PW is within an allowable generation power range R (step S20). Here, the allowable generation power range R refers to a range greater than or equal to the lower limit generation power value LL and less than or equal to the upper limit generation power value UL, including the planned generation power value PT.

As a result of a determination at step S20, if the wind generated power PW is in the allowable generation power range R (Yes at step S20), as the wind generated power PW can be directly transmitted as the system generated power PS, the charge-discharge power command operation unit 34 is free from processing the planned generation power value follow-up control.

Further, if the wind generated power PW is not in the allowable generation power range R (No at step S20), and greater than the upper limit generation power value UL (Yes at step S21), the charge-discharge power command operation unit 34 calculates the charge-discharge power PB required for the planned generation power follow-up control according to a formula: PB=UL−PW (step S22). Note that the charge-discharge power PB calculated at this time becomes a negative value, which is a power to be charged in the storage battery system 2.

Then, the charge-discharge power command operation unit 34 determines whether or not the absolute value of the calculated charge-discharge power PB (as the calculated charging-discharging power PB is a negative number) is less than or equal to the chargeable power of the storage battery system 2 at that time (step S23). Note that the chargeable power is a value which is calculated mainly with the battery charging rate SOC of the storage battery system 2 at that time.

As a result of the determination at step S23, if the absolute value of the charge-discharge power PB is less than or equal to the chargeable power of the storage battery system 2 at that time (Yes at step S23), as the charge-discharge power PB, calculated as the power to be charged, can be charged in the storage battery system 2, the charge-discharge power command operation unit 34 sets the charge-discharge power PB calculated at step S22 as the charge-discharge power command PBC (step S24).

On the other hand, as a result of the determination at step S23, if the absolute value of the charge-discharge power PB exceeds the chargeable power at that time (No at step S23), all the charge-discharge power, calculated as the power to be charged, cannot be charged in the storage battery system 2. Then, in this case, the charge-discharge power command operation unit 34 sets the chargeable power as the charge-discharge power command PBC (step S25). In addition, the generation power limiting command operation unit 35 sets a value, obtained by adding the chargeable power to the upper limit generation power value UL, as the generation power limiting command PLC (step S26).

It should be noted that the processing at steps S25 and S26 is intended so as to make the wind power generator group 1 avoid generating an excess power, when the wind generated power PW over the charging capacity of the storage battery system 2 is being generated, by calculating the generation power limiting command PLC so as to avoid generating an excess power over the charging capacity, and distributing the calculated generation power limiting command PLC to the wind power generator group 1.

Further, if the wind generated power PW is not in the allowable generation power range R (No at step S20), and less than the upper limit generation power value UL (No at step S21), that is, if the wind generated power PW is less than the lower limit generation power value LL, the charge-discharge power command operation unit 34 calculates the charge-discharge power PB required for the planned generation power follow-up control according to a formula: PB=LL−PW (step S27). Note that the charge-discharge power PB calculated at this time becomes a positive value, which is a power to be discharged from the storage battery system 2. Then, the charge-discharge power command operation unit 34 sets the charge-discharge power PB as the charge-discharge power command PBC for the storage battery system 2 (step S28).

It should be noted that the charge-discharge power command PBC and the generation power limiting command PLC, which are calculated in the processing above, will be sent to the storage battery system 2 (storage batteries 21 (#1, #2, - - - , #m)) and the wind power generator group 1, respectively, where the charge-discharge power command PBC is in fact the charge-discharge power commands PBC #1, PBC #2, - - - , PBC #m, which are further distributed to the storage batteries 21 (#1, #2, - - - , #m), respectively, by the charge-discharge power command distribution unit 36.

Then, the storage battery system 2 (storage batteries 21 (#1, #2, - - - , #m)) charges and discharges power, according to the received charge-discharge power command PBC (PBC #1, PBC #2, - - - , PBC #m), and the wind power generator group 1 limits the wind generated power PW so as to avoid generating power more than necessary, according to the received generation power limiting command PLC. A control is implemented in this way for making the system generated power PS in the promised period follow the planned generation power value PT.

As described above, in the planned generation power value follow-up control process shown in FIG. 8, if the wind generated power PW is in the allowable generation power range R (Yes at step S20), the charge-discharge power command operation unit 34 is free from processing the planned generation power value follow-up control. However, when the battery charging rate SOC at that time deviates from the targeted charging rate range SOCT, a following control process may be further added in order to set the battery charging rate SOC back to the targeted charging rate range SOCT.

For example, if the battery charging rate SOC deviates to a value greater than the upper limit value of the targeted charging rate range SOCT, a control will be made to increase the discharge power from the storage battery system 2, in order to decrease the battery charging rate SOC. For that purpose, similar to the process at step S22 in FIG. 8, the charge-discharge power PB required for the planned generation power value follow-up control is calculated according to the formula: PB=UL−PW. This means to make the system generated power PS follow the upper limit generation power value UL. That is, as the system generated power PS is set to the maximum value of the allowable generation power range R, the charge-discharge power PB from the storage battery system 2 increases, which in turn decreases the battery charging rate SOC.

Alternatively, the wind generated power PW may be reduced intentionally, in order to lower the battery charging rate SOC. For that purpose, the generation power limiting command operation unit 35 outputs the generation power limiting command PLC to the wind power generator group 1 for reducing the wind generated power PW. In this case, the charge-discharge power PB from the storage battery system 2 increases in order to complement the reduced power, then the battery charging rate SOC is lowered.

In addition, if the battery charging rate SOC deviates to a value less than the lower limit value of the targeted charging rate range SOCT, a control will be made to increase the charge power to the storage battery system 2, in order to increase the battery charging rate SOC. For that purpose, similar to the process at step S27 in FIG. 8, the charge-discharge power PB required for the planned generation power value follow-up control is calculated according to the formula: PB=LL−PW. This means to make the system generated power PS follow the lower limit generation power value LL. That is, as the system generated power PS is set to the minimum value of the allowable generation power range R, the charging power to the storage battery system 2 increases, which in turn increases the battery charging rate SOC.

Incidentally, there will be a case in which sufficient wind generated power PW cannot be gained due to continued weak-wind conditions, the storage battery system 2 has a small storage capacity, and the battery charging rate SOC is decreased at that time. In such a case, as a dischargeable power of the storage battery system 2 is not enough to complement the wind generated power PW, the system generated power PS with the wind power generation system 100 may be decreased below the lower limit generation power value LL of the planned generation power value PT.

A situation in which the system generated power PS is less than the lower limit generation power value LL of the planned generation power value PT means that there is a failure in complying with the terms and conditions of the contract with the electric power buyer, imposing a penalty on the selling price of electricity, where the terms and conditions is said to supply the system generated power PS in the range greater than or equal to the lower limit generation power value LL and less than or equal to the upper limit generation power value UL. Therefore, the wind power generation system 100 is required to improve the compliance rate on the terms and conditions of the contract with the electric power buyer.

Figure 9:
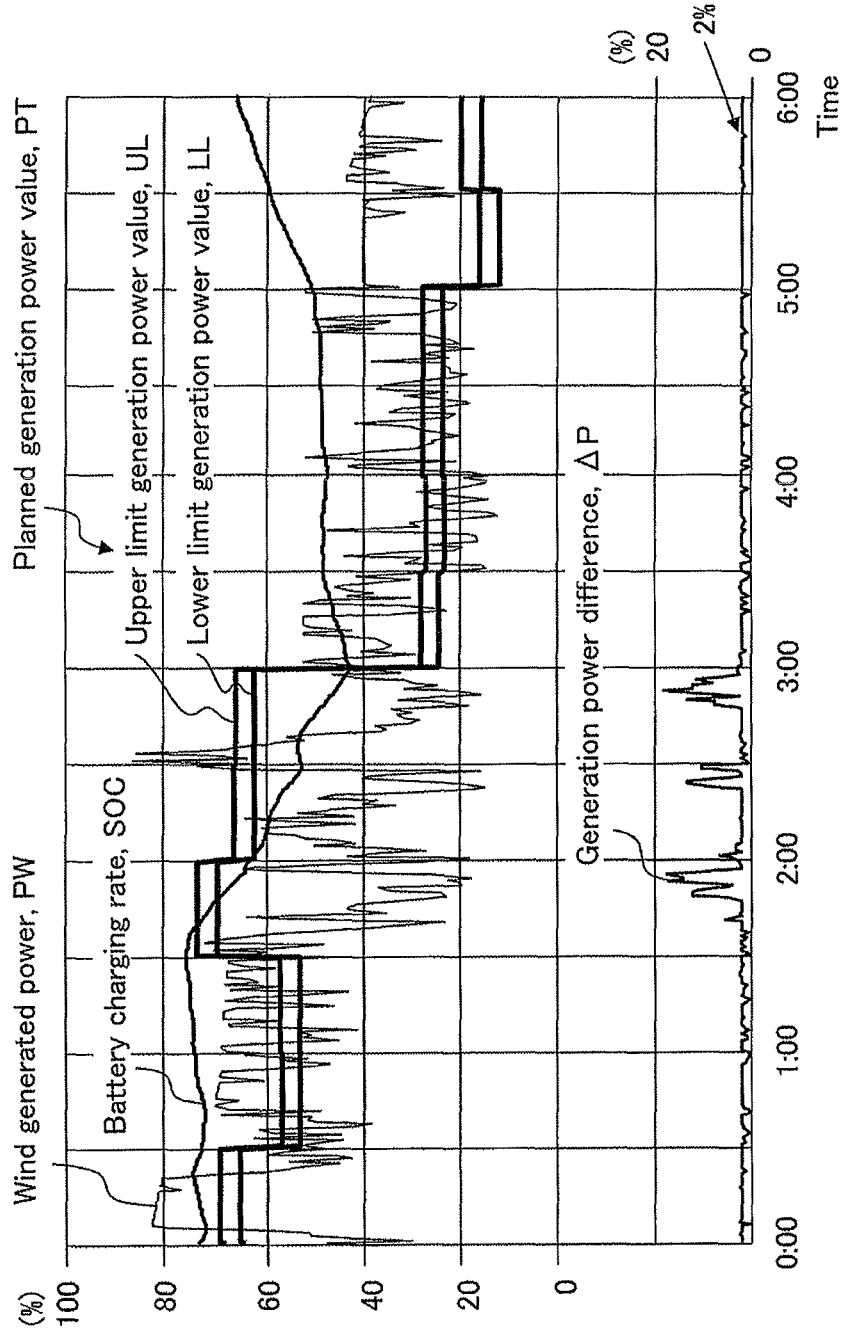
FIG. 9 is a chart showing an example of a power generation control simulation in the wind power generation system according to the first embodiment of the present invention.
Figure 10:
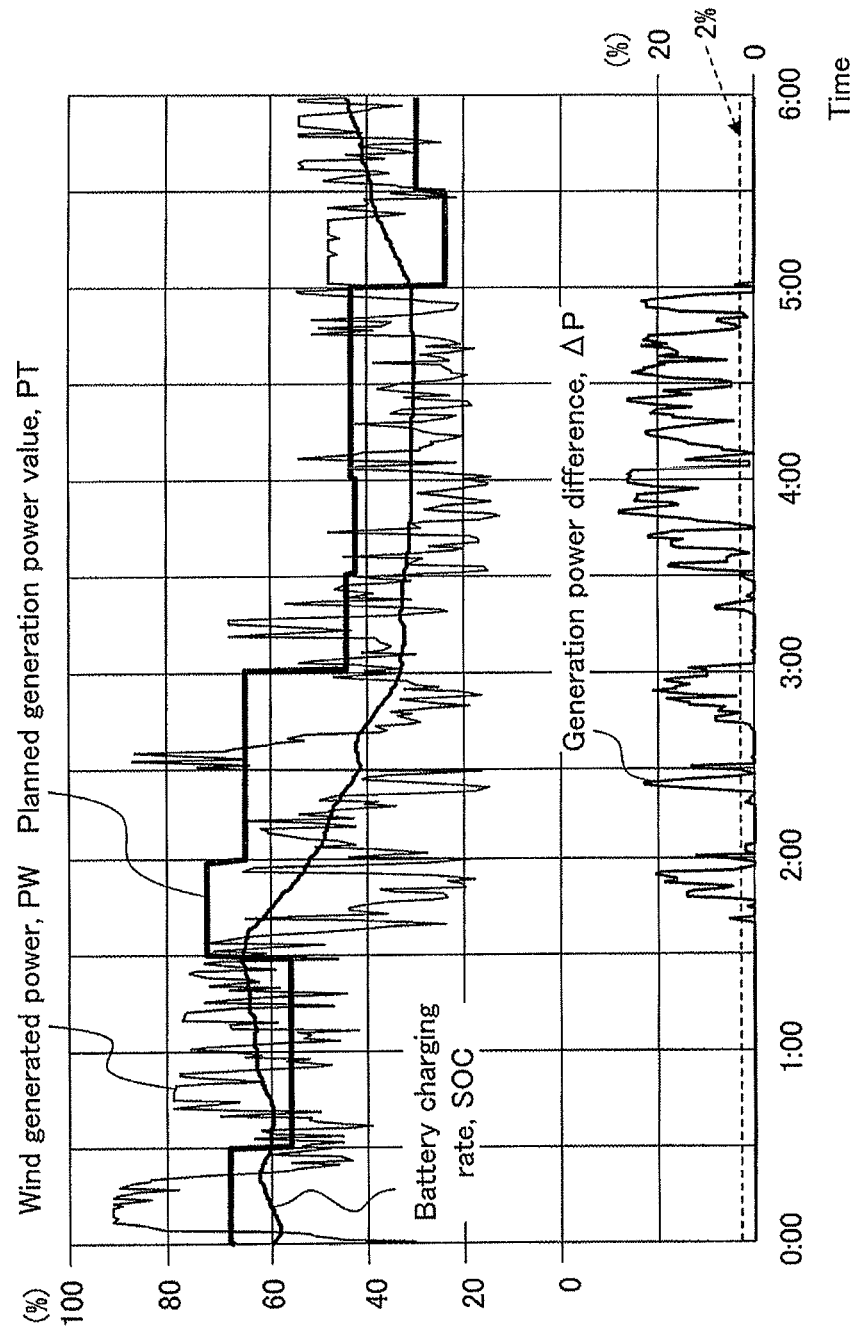
FIG. 10 is a chart for comparison, showing an example of a power generation control simulation at a constant-output control type of wind power plant in general.

FIG. 9 is a diagram showing an example of a power generation control simulation in the wind power generation system 100 according to the first embodiment of the present invention. In addition, FIG. 10 is a diagram showing, as a comparative example, an example of a power generation control simulation at the constant-output control type of wind power plant in general.

These power generation control simulations were made with 30 minutes of operation period, 60 minutes of follow-up control period, and 60 minutes of promised period, for calculating temporal transitions of data in all six hours, such as the wind generated power PW, the charge-discharge power PB, the system generated power PS, the planned generation power value PT, and the battery charging rate SOC, provided with actual measured values of wind power.

Additionally, in the power generation control simulations, the rated charge-discharge power of the storage battery system 2 was set to 30% of the rated wind generation power of the wind power generator group 1. A setting value of 30% is extremely low, considering that the rated charge-discharge power of the storage battery system 2 at a conventional wind power plant having storage batteries is about 85% of the rated wind generation power.

Note that there is a big difference in setting the planned generation power value PT between the power generation control simulation of the wind power generation system 100 according to the first embodiment of the present invention, and the power generation control simulation of the comparative example. That is, in the first embodiment of the present invention, the planned generation power value PT in the promised period is set, as shown in FIG. 4, with the average generated power value PA, a value greater than the average generated power value PA, or a value less than the average generated power value PA, respectively, depending on whether the battery charging rate SOC is, within the range of the targeted charging rate range SOCT, greater than the upper limit value, or below the lower limit value. In contrast, in the power generation control simulation of the comparative example, the planned power generation value PT in the promised period is set to the average generated power value PA in the operation period, and none other.

The results of the power generation control simulations described above are as shown in FIGS. 9 and 10, but the graphs of temporal transition shown in FIGS. 9 and 10 show only the temporal transition of the wind generated power PW, the planned generation power value PT, the battery charging rate SOC, and a generation power difference ΔP, in order to avoid graphs becoming complicated. Here, the generation power difference ΔP is the ratio of the amount of difference between the system generated power PS and the planned generation power value PT relative to the planned generation power value PT, represented by a formula ΔP=|PS−PT|/PT. Thus, if the generation power difference ΔP exceeds 2%, for example, it means that such a case fails to comply with the terms and conditions of the contract with the electric power buyer.

According to FIGS. 9 and 10, in case of the wind power generation system 100 of the first embodiment of the present invention, a duration of time when the generation power difference ΔP exceeds 2% of the planned generation power value PT is around 40 minutes among 6 hours in total, however in case of the comparative example, a duration of time when the generated power difference ΔP exceeds 2% of the planned generation power value PT is around 120 minutes among 6 hours in total. Therefore, the wind power generation system 100 according to the first embodiment of the present invention has an effect of substantially improving the compliance rate, as compared to the comparative example (prior art), to comply with the terms and conditions of the contract with the electric power buyer for regulating the variation of the system generated power PS within plus or minus 2% of the planned generation power value PT.

It should be noted that, in the power generation control simulation described above, the rated charge-discharge power of the storage battery system 2 is set to 30% of the rated wind power generation of the wind power generator group 1, but it is apparent that increasing the set value improves the compliance rate to comply with the terms and conditions of the contract with the electric power buyer, and decreasing the set value degrades the compliance rate to comply with the terms and conditions of the contract with the electric power buyer. Therefore, the wind power generation system 100 of the first embodiment of the present invention is capable of achieving the compliance rate at the same level as that of the comparative example (prior art), with the storage battery system 2 having a rated charge-discharge power less than the rated wind power generation of the wind power generator group 1.

As described above, according to the first embodiment of the present invention, as total storage capacity (e.g., the number of the storage batteries 21) will be reduced in the storage battery system 2 of the wind power generation system 100, the installation cost of the wind power generation system 100 will be reduced. Therefore, the power generation business will be stabilized with the wind power generation system 100.

Second Embodiment

Figure 11:
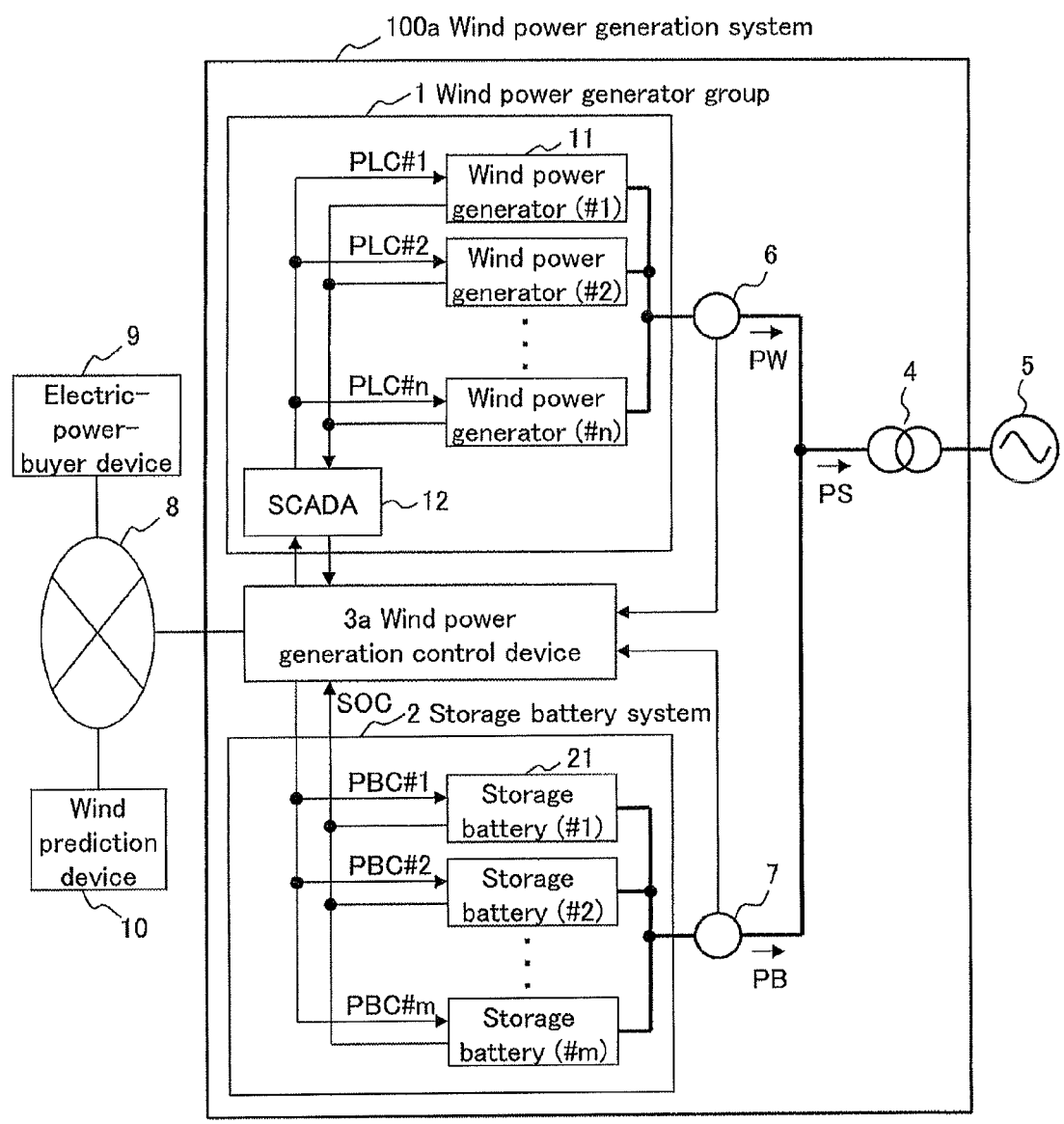
FIG. 11 is a diagram showing an example configuration of a wind power generation system according to a second embodiment of the present invention.
Figure 12:
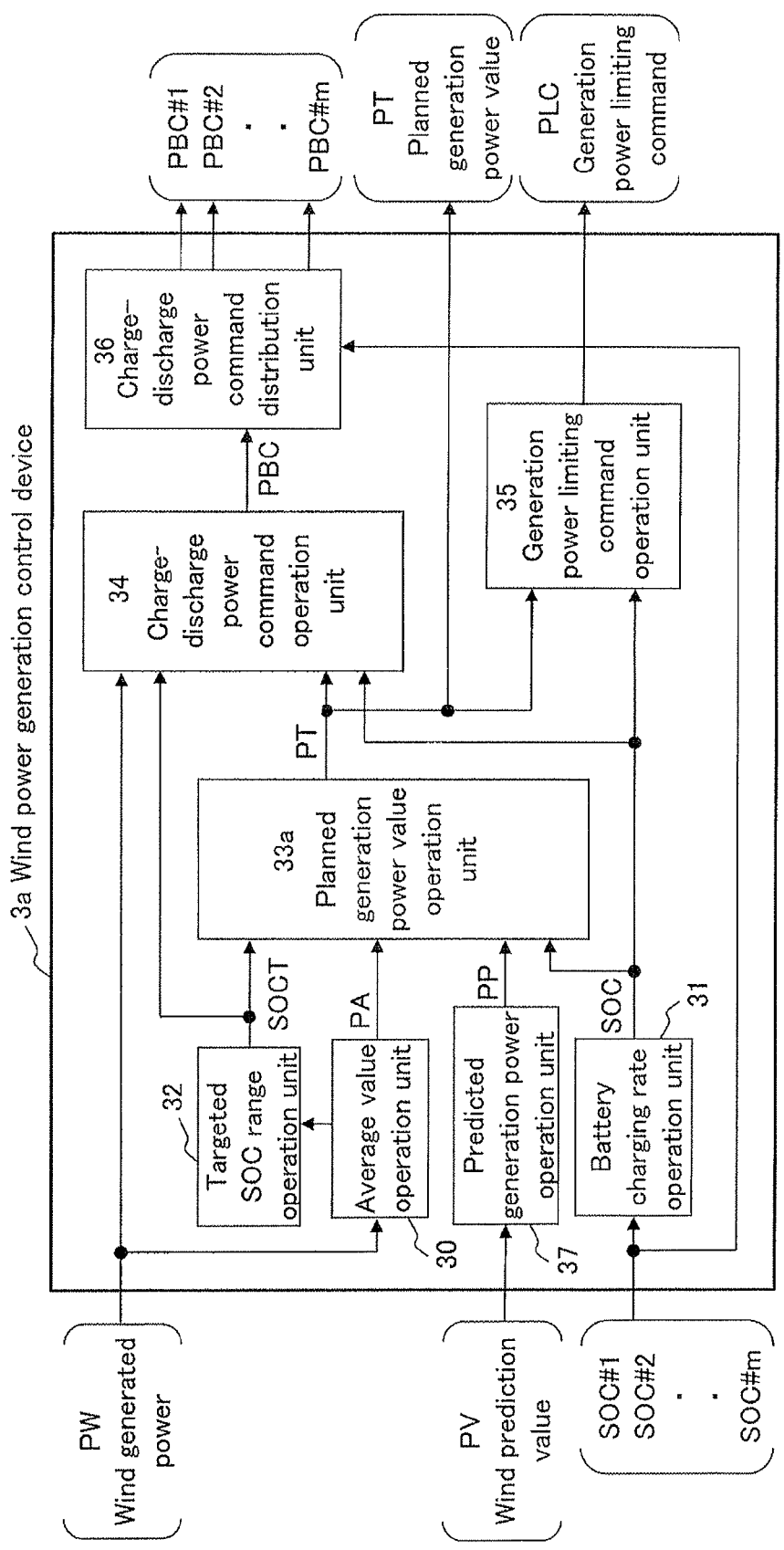
FIG. 12 is an example block diagram of a wind power generation control device according to a second embodiment of the present invention.

FIG. 11 is a diagram showing an example of the configuration of the wind power generation system 100a according to a second embodiment of the present invention. In addition, FIG. 12 is a diagram showing an example of a block diagram of a wind power generation control device 3a according to the second embodiment of the present invention. As many components are same in the first and second embodiments, the same components are denoted by the same reference numerals and the description thereof is omitted, then only those components will be described which are different from the first embodiment.

As shown in FIG. 11, the wind power generation system 100a according to the second embodiment is different from the wind power generation system 100 (see FIG. 1) according to the first embodiment 1 on a point that the former is connected to a wind prediction device 10 via the communication network 8. The wind prediction device 10 transmits prediction information (hereinafter referred to as wind prediction values) including one or more of a wind speed, a wind direction, an air temperature, humidity, and air pressure at the wind power plant site, to the wind power generation control device 3, via the communication network 8, either sequentially or collectively by saving such information for a certain period of time.

In addition, as shown in FIG. 12, the wind power generation control device 3a according to the second embodiment is different from the wind power generation control device 3 (see FIG. 3) according to the first embodiment, on a point that the former is provided with the predicted generation power operation unit 37, which receives and processes the wind prediction values PV transmitted from the wind prediction device 10, then calculates a predicted generation power PP. The predicted generation power PP, calculated by the predicted generation power operation unit 37, is inputted to the planned generation power value operation unit 33a.

Therefore, when calculating the planned generation power value PT, the planned generation power value operation unit 33a uses the predicted generation power PP, calculated by the predicted generation power operation unit 37, in addition to the average generated power value PA, calculated by the average value operation unit 30, the targeted charging rate range SOCT, calculated by the targeted SOC range operation unit 32, and battery charging rates SOC #1, SOC #2, - - - , SOC #m obtained from the respective storage batteries 21.

It should be noted that the control operations of the other blocks than the predicted generation power operation unit 37 and the planned generation power value operation unit 33a are the same as those in the first embodiment.

Figure 13:
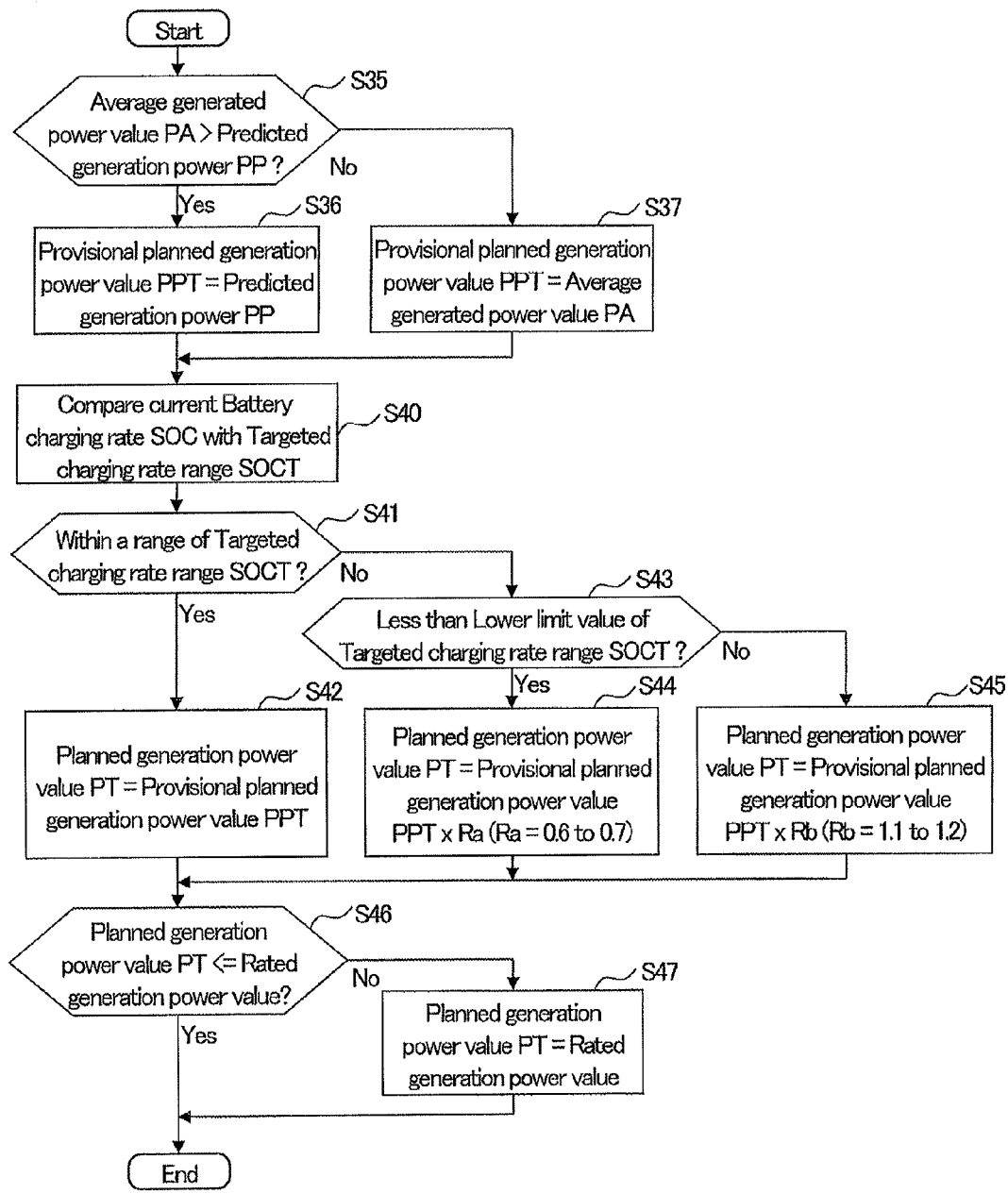
FIG. 13 is an example process flow of a planned power generation value operation in the planned power generation value operation unit according to a second embodiment of the present invention.

FIG. 13 is a diagram showing an example process flow of the planned generation power value operation in the planned generation power value operation unit 33a according to the second embodiment of the present invention. As shown in FIG. 13, the planned generation power value operation unit 33a first determines whether or not the average generated power value PA, calculated by the average value operation unit 30, is greater than the predicted generation power PP, calculated by the predicted generation power operation unit 37 (step S35).

As a result of the determination, if the average generated power value PA is larger than the predicted generation power PP (Yes at step S35), the planned generation power value operation unit 33a sets the predicted generation power PP as a provisional planned generation power value PPT (step S36). On the other hand, if the average generated power value PA is not greater than the predicted generation power PP (No at step S35), the planned generation power value operation unit 33a sets the average generated power value PA as the provisional generation power value PPT (step S37).

Hereinafter, the processing from step S40 to step S47 is in accordance with the processing from step S10 to step S17 (see FIG. 4) in the operational process flow in the case of the first embodiment. That is, the processing from step S40 to step S47 corresponds to the processing from step S10 to step S17 in FIG. 4, where the term average generated power value PA is to be replaced with the provisional planned generation power value PPT.

Thus, subsequent to step S36 or step S37, the planned generation power value operation unit 33a compares the current battery charging rate SOC of the storage battery system 2 with the targeted charging rate range SOCT, calculated by the targeted SOC range operation unit 32 (step S40).

As a result of the comparison, if the battery charging rate SOC is in the range of the targeted charging rate range SOCT (Yes at step S41), the planned generation power value operation unit 33a sets the provisional generation power value PPT as the planned generation power value PT (step S42).

In addition, if the current battery charging rate SOC is less than the lower limit value of the targeted charging rate range SOCT (Yes at step S43), the planned generation power value operation unit 33a sets a value, obtained by multiplying the positive constant Ra less than 1 to the provisional generation power value PPT, as the planned generation power value PT (step S44). Note that the value of Ra is desirably about 0.6 to 0.7, as in the case of the first embodiment.

Further, if the current battery charging rate SOC is neither within the range of the targeted charging range SOCT, nor less than the lower limit value of the targeted charging rate range SOCT (No at step S43), that is, if the current battery charging rate SOC exceeds the upper limit value of the targeted charging rate range SOCT, the planned generation power value operation unit 33a sets a value, obtained by multiplying a positive constant Rb greater than 1 to the provisional planned generation power value PPT, as the planned generation power value PT (step S45). Note that the value of Rb is desirably about 1.1 to 1.2, as in the case of the first embodiment.

After calculating the planned generation power value PT as described above, the planned generation power value operation unit 33a determines whether or not the calculated planned generation power value PT is less than or equal to the rated generation power value of the wind power generation system 100 (step S46). And, if the planned generation power value PT is less than or equal to the rated generation power value of the wind power generation system 100 (Yes at step S46), the planned generation power value operation unit 33a ends the planned generation power value operation process instantly. Alternatively, if the planned generation power value PT exceeds the rated generation power value of the wind power generation system 100 (No at step S46), the planned generation power value operation unit 33a resets the planned generation power value PT with the rated generation power value (reset) (step S47), and then ends the planned generation power value operation process.

According to the process of the planned generation power value operation described above, when wind conditions in the promised period are predicted to become weaker than that in the operation period, therefore the predicted generation power PP in the promised period is predicted to become smaller than the average generated power PA in the operation period (corresponding to the case of Yes at step S35), the planned generation power value PT is calculated based on the predicted generation power PP. In addition, when wind conditions in the promised period are predicted to become stronger than that in the operation period, therefore the predicted generation power PP in the promised period is predicted to become larger than the average generated power value PA in the operation period (corresponding to the case of No at step S35), the planned generation power value PT is calculated based on the average generated power value PA.

Note that the planned generation power value PT is set relatively low in the processing described above, in preparation for a case when sufficient wind generated power PW is unobtainable due to weaker wind than predicted, then it is possible to prevent the battery charging rate SOC of the storage battery system 2 from excessively being lowered. Further, in a case when an excessive wind generated power PW is obtainable due to stronger wind than predicted, as a part of the excessive wind generated power PW can be discarded by the generation power limiting command PLC from the generation power limiting command operation unit 35, the planned generation power value PT is set relatively low, also in this case.

Therefore, even if a total storage capacity (e.g., the number of the storage batteries 21) of the storage battery system 2 is reduced, the wind power generation system 100a according to the second embodiment is capable of improving the compliance rate, similarly to the first embodiment or more than that, to comply with the terms and conditions of the contract for regulating the variation of the system generated power PS within the promised variation range (e.g., within plus or minus 2% of the planned generation power value PT).

According to the second embodiment of the present invention above, as the total storage capacity (e.g., the number of the storage batteries 21) of the storage battery system 2 in the wind power generation system 100a can be reduced, the installation cost of the wind power generation system 100a can be reduced. Therefore, the power generation business will be stabilized with the wind power generation system 100a.

It should be noted that the present invention is not limited to the embodiments described above, but further includes various modifications. For example, above embodiments have been described in detail for easy understanding of the present invention, and are not necessarily limited to those having all the configurations described above. In addition, a configuration of one embodiment may be replaced with a configuration of the other embodiment, or a configuration of one embodiment may be added with a configuration of the other embodiment.

What is claimed is:
1. A wind power generation system comprising:
a wind power generator group composed of a plurality of wind power generators;
a storage battery system composed of a plurality of batteries; and
a wind power generation control device that performs a control so that a system generated power, obtained by adding a wind generated power generated by the wind power generator group and a charge-discharge power charged and discharged by the storage battery system, falls within an allowable range of a planned generation power value set in advance, over the charge-discharge power,
wherein the wind power generation control device comprises:
an average value operation unit that calculates an average value of the wind generated power generated by the wind power generator group during a first control period before the present time;
a targeted SOC (State Of Charge) range operation unit that calculates a targeted battery charging rate range of the storage battery system; and
a planned generation power value operation unit that calculates a planned generation power value for a second control period which is set later than the present time, based on the average value of the wind generated power calculated by the average value operation unit,
wherein the planned generation power value operation unit sets as the planned generation power value:
the average value of the wind generated power, when a current battery charging rate of the storage battery system is in the range of the upper and lower limit values of the targeted battery charging rate range;
a value obtained by multiplying a positive constant greater than 1 to the average value of the wind generated power, when the current battery charging rate of the storage battery system is above the upper limit value of the targeted battery charging rate range; and
a value obtained by multiplying a positive constant less than 1 to the average value of the wind generated power, when the current battery charging rate of the storage battery system is below the lower limit value of the targeted battery charging rate range.
2. The wind power generation system according to claim 1, wherein the wind power generation control device further comprises
a predicted generation power operation unit that is connected to a wind prediction device that predicts wind conditions later than the present time, and calculates a predicted wind generation power in the second control period, based on wind prediction information in the second control period provided from the wind prediction device, and
when calculating the planned generation power value, the planned generation power value operation unit corrects the average value of the wind generated power used in the calculation, using the predicted wind generation power, and calculates the planned generation power value, based on the average value of the wind generated power after the correction.
3. The wind power generation system according to claim 2, wherein, if the average value of the wind generated power is greater than the predictive wind generation power when correcting the average value of the wind generated power to be used for calculating the planned generation power value, the wind power generation control device corrects the average value of the wind generated power by replacing the average value of the wind generated power with the predictive wind generation power.

4. The wind power generation system according to claim 1, wherein the wind power generation control device calculates the charge-discharge power so that, when the wind generated power is above the upper limit value of the allowable range of the planned generation power value, the system generated power becomes equal to the upper limit value of the allowable range of the planned generation power value, and when the wind generated power is below the lower limit value of the allowable range of the planned generation power value, the system generated power becomes equal to the lower limit value of the allowable range of the planned generation power value, then controls the storage battery system so as to charge and discharge the calculated charge-discharge power.

5. The wind power generation system according to claim 1, wherein the wind power generation control device outputs, when the wind generated power generated by the wind power generator group exceeds a power, obtained by adding the planned generation power value and a chargeable power of the storage battery system at that time, a command to limit a power corresponding to the amount of the exceeding power to the wind power generator group.

6. A wind power generation control method, for use by a wind power generation system comprising:

a wind power generator group composed of a plurality of wind power generators;

a storage battery system composed of a plurality of batteries; and a wind power generation control device that performs a control so that a system generated power, obtained by adding a wind generated power generated by the wind power generator group and a charge-discharge power charged and discharged by the storage battery system, falls within an allowable range of a planned generation power value set in advance, over the charge-discharge power, wherein the wind power generation control device comprises:

an average value operation unit that calculates an average value of the wind generated power generated by the wind power generator group during a first control period before the present time;

a targeted SOC range operation unit that calculates a targeted battery charging rate range of the storage battery system; and a planned generation power value operation unit that calculates a planned generation power value for a second control period which is set later than the present time, based on the average value of the wind generated power calculated by the average value operation unit, wherein the planned generation power value operation unit sets as the planned generation power value:

the average value of the wind generated power, when a current battery charging rate of the storage battery system is in the range of the upper and lower limit values of the targeted battery charging rate range;

a value obtained by multiplying a positive constant greater than 1 to the average value of the wind generated power, when the current battery charging rate of the storage battery system is above the upper limit value of the targeted battery charging rate range; and a value obtained by multiplying a positive constant less than 1 to the average value of the wind generated power, when the current battery charging rate of the storage battery system is below the lower limit value of the targeted battery charging rate range.

7. The wind power generation control method according to claim 6, wherein the wind power generation control device further comprises a predicted generation power operation unit that is connected to a wind prediction device that predicts wind conditions later than the present time, and calculates a predicted wind generation power in the second control period, based on wind prediction information in the second control period provided from the wind prediction device, and when calculating the planned generation power value, the planned generation power value operation unit corrects the average value of the wind generated power used in the calculation, using the predicted wind generation power, and calculates the planned generation power value, based on the average value of the wind generated power after the correction.

8. The wind power generation control method according to claim 7, wherein, if the average value of the wind generated power is greater than the predictive wind generation power when correcting the average value of the wind generated power to be used for calculating the planned generation power value, the wind power generation control device corrects the average value of the wind generated power by replacing the average value of the wind generated power with the predictive wind generation power.

9. The wind power generation control method according to claim 6, wherein the wind power generation control device calculates the charge-discharge power so that, when the wind generated power is above the upper limit value of the allowable range of the planned generation power value, the system generated power becomes equal to the upper limit value of the allowable range of the planned generation power value, and when the wind generated power is below the lower limit value of the allowable range of the planned generation power value, the system generated power becomes equal to the lower limit value of the allowable range of the planned generation power value, then controls the storage battery system so as to charge and discharge the calculated charge-discharge power.

10. The wind power generation control method according to claim 6, wherein the wind power generation control device outputs, when the wind generated power generated by the wind power generator group exceeds a power, obtained by adding the planned generation power value and a chargeable power of the storage battery system at that time, a command to limit a power corresponding to the amount of the exceeding power to the wind power generator group.

11. A wind power generation control device, connected to a wind power generator group composed of a plurality of wind power generators and a storage battery system composed of a plurality of batteries, comprising:

a charge-discharge power command operation unit that performs a calculation so that a system generated power, obtained by adding a wind generated power generated by the wind power generator group and a charge-discharge power charged and discharged by the storage battery system, falls within an allowable range of a planned generation power value set in advance, on the charge-discharge power, and outputs the calculated charge-discharge power to the storage battery system;

an average value operation unit that calculates an average value of the wind generated power generated by the wind power generator group during a first control period before the present time;

a targeted SOC range operation unit that calculates a targeted battery charging rate range of the storage battery system; and a planned generation power value operation unit that calculates a planned generation power value for a second control period which is set later than the present time, based on the average value of the wind generated power calculated by the average value operation unit, wherein the planned generation power value operation unit sets as the planned generation power value:

the average value of the wind generated power, when a current battery charging rate of the storage battery system is in the range of the upper and lower limit values of the targeted battery charging rate range;

a value obtained by multiplying a positive constant greater than 1 to the average value of the wind generated power, when the current battery charging rate of the storage battery system is above the upper limit value of the targeted battery charging rate range; and a value obtained by multiplying a positive constant less than 1 to the average value of the wind generated power, when the current battery charging rate of the storage battery system is below the lower limit value of the targeted battery charging rate range.

12. The wind power generation control device according to claim 11, wherein the wind power generation control device further comprises a predicted generation power operation unit that is connected to a wind prediction device that predicts wind conditions later than the present time, and calculates a predicted wind generation power in the second control period, based on wind prediction information in the second control period provided from the wind prediction device, and when calculating the planned generation power value, the planned generation power value operation unit corrects the average value of the wind generated power used in the calculation, using the predicted wind generation power, and calculates the planned generation power value, based on the average value of the wind generated power after the correction.

13. The wind power generation control device according to claim 12, wherein, if the average value of the wind generated power is greater than the predictive wind generation power when correcting the average value of the wind generated power to be used for calculating the planned generation power value, the wind power generation control device corrects the average value of the wind generated power by replacing the average value of the wind generated power with the predictive wind generation power.

14. The wind power generation control device according to claim 11, wherein the wind power generation control device calculates the charge-discharge power so that, when the wind generated power is above the upper limit value of the allowable range of the planned generation power value, the system generated power becomes equal to the upper limit value of the allowable range of the planned generation power value, and when the wind generated power is below the lower limit value of the allowable range of the planned generation power value, the system generated power becomes equal to the lower limit value of the allowable range of the planned generation power value, then controls the storage battery system so as to charge and discharge the calculated charge-discharge power.

15. The wind power generation control device according to claim 11, wherein the wind power generation control device outputs, when the wind generated power generated by the wind power generator group exceeds a power, obtained by adding the planned generation power value and a chargeable power of the storage battery system at that time, a command to limit a power corresponding to the amount of the exceeding power to the wind power generator group.

* * * * *